US009591686B2

(12) United States Patent
Zisimopoulos et al.

(10) Patent No.: US 9,591,686 B2
(45) Date of Patent: Mar. 7, 2017

(54) ACCESS CLASS BARRING FOR DEVICE-TO-DEVICE PROXIMITY SERVICE COMMUNICATIONS

(71) Applicant: QUALCOMM Incorporated, San Diego, CA (US)

(72) Inventors: Haris Zisimopoulos, London (GB); Hong Cheng, Basking Ridge, NJ (US); Michaela Vanderveen, Tracy, CA (US); Georgios Tsirtsis, London (GB); Lenaig Genevieve Chaponniere, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/809,958

(22) Filed: Jul. 27, 2015

(65) Prior Publication Data
US 2016/0044727 A1 Feb. 11, 2016

Related U.S. Application Data

(60) Provisional application No. 62/035,860, filed on Aug. 11, 2014.

(51) Int. Cl.
*H04W 76/02* (2009.01)
*H04W 4/00* (2009.01)
(Continued)

(52) U.S. Cl.
CPC ......... *H04W 76/023* (2013.01); *H04W 4/008* (2013.01); *H04W 48/02* (2013.01);
(Continued)

(58) Field of Classification Search
CPC ... H04W 76/023; H04W 8/005; H04W 4/008; H04W 48/02; H04W 48/12; H04W 76/046
(Continued)

(56) References Cited

U.S. PATENT DOCUMENTS 6,275,695 B1 * 8/2001 Obhan ............... H04L 12/2602
455/423
6,366,780 B1 * 4/2002 Obhan .................. H04W 16/00
370/329

(Continued)

FOREIGN PATENT DOCUMENTS

WO WO-2013191504 A1 12/2013
WO WO-2014077745 A1 5/2014

OTHER PUBLICATIONS

ISA/EPO, International Search Report and Written Opinion of the International Searching Authority, Int'l. App. No. PCT/US2015/042403, Oct. 21, 2015, European Patent Office, Rijswijk, NL 10 pgs.

(Continued)

*Primary Examiner* — Hai V Nguyen
(74) *Attorney, Agent, or Firm* — Holland & Hart LLP

(57) ABSTRACT

Methods, systems, and devices are described for access class barring (ACB) operations for device-to-device (D2D proximity service communications. An ACB parameter may be defined and assigned to UEs that is associated with discovery or communication operations for normal and high priority user equipments (UEs). The UE may identify a resource for D2D proximity service communications and, when not barred, send a radio resource control (RRC) connection message requesting the available resource. An establishment cause may be defined and included in the RRC connection request message that corresponds to the ACB parameter.

28 Claims, 15 Drawing Sheets

(51) Int. Cl.
*H04W 48/02* (2009.01)
*H04W 8/00* (2009.01)
*H04W 76/04* (2009.01)
*H04W 48/12* (2009.01)

(52) U.S. Cl.
CPC ............ *H04W 8/005* (2013.01); *H04W 48/12* (2013.01); *H04W 76/046* (2013.01)

(58) Field of Classification Search
USPC ........................................................ 455/41.2
See application file for complete search history.

(56) References Cited

U.S. PATENT DOCUMENTS

| | | | | |
|---|---|---|---|---|
| 6,910,211 | B1* | 6/2005 | Wilhelm, Jr. ............ | G06F 9/52 718/102 |
| 8,423,029 | B2* | 4/2013 | De Pasquale ......... | H04W 28/16 370/335 |
| 8,837,443 | B2* | 9/2014 | Yamada .................. | H04L 47/12 370/230 |
| 8,874,113 | B2* | 10/2014 | Chin ..................... | H04W 36/22 455/436 |
| 9,037,137 | B2* | 5/2015 | Klatt ..................... | H04W 48/02 370/235 |
| 9,037,147 | B2* | 5/2015 | Tabrizi .................. | H04W 72/08 455/452.1 |
| 9,226,256 | B2* | 12/2015 | Velev .................... | H04W 60/06 |
| 9,282,572 | B1* | 3/2016 | Shah ..................... | H04W 74/00 |
| 9,293,939 | B2* | 3/2016 | Moindron ............. | H02J 7/0072 |
| 9,294,886 | B2* | 3/2016 | Anchan .................. | H04W 4/08 |
| 2011/0076966 | A1* | 3/2011 | Ishimiya ................ | H01Q 1/242 455/78 |
| 2011/0201307 | A1* | 8/2011 | Segura .................. | H04W 48/02 455/411 |
| 2012/0033613 | A1 | 2/2012 | Lin et al. | |
| 2012/0039171 | A1 | 2/2012 | Yamada et al. | |
| 2012/0051297 | A1 | 3/2012 | Lee et al. | |
| 2012/0076085 | A1* | 3/2012 | Chou .................... | H04W 68/00 370/329 |
| 2012/0082103 | A1* | 4/2012 | Lin ...................... | H04W 74/085 370/329 |
| 2012/0155274 | A1* | 6/2012 | Wang .................... | H04W 12/12 370/236 |
| 2013/0122906 | A1* | 5/2013 | Klatt ..................... | H04W 48/02 455/435.1 |
| 2013/0130688 | A1* | 5/2013 | Chin ..................... | H04W 36/22 455/436 |
| 2014/0003348 | A1* | 1/2014 | Velev .................... | H04W 60/06 370/328 |
| 2014/0064177 | A1* | 3/2014 | Anchan .................. | H04W 4/08 370/312 |
| 2014/0080533 | A1* | 3/2014 | Tabrizi .................. | H04W 72/08 455/513 |
| 2014/0171061 | A1* | 6/2014 | Larmo ................. | H04W 74/006 455/422.1 |
| 2014/0206322 | A1 | 7/2014 | Dimou et al. | |
| 2014/0357297 | A1* | 12/2014 | Futaki ................... | H04W 24/10 455/456.1 |
| 2014/0369190 | A1* | 12/2014 | Chan ....................... | H04L 47/24 370/230 |
| 2015/0078245 | A1* | 3/2015 | Anchan ................. | H04M 13/00 370/312 |
| 2015/0079979 | A1* | 3/2015 | Anchan ................. | H04L 12/189 455/433 |
| 2015/0163662 | A1* | 6/2015 | Klatt ..................... | H04W 48/02 455/434 |
| 2015/0223077 | A1* | 8/2015 | Fan ....................... | H04W 16/14 370/312 |
| 2015/0245192 | A1* | 8/2015 | Wu ....................... | H04W 8/005 370/329 |
| 2015/0327312 | A1* | 11/2015 | Burbidge ............. | H04W 76/023 370/329 |
| 2016/0112858 | A1* | 4/2016 | Nguyen ................ | H04W 8/005 370/329 |

OTHER PUBLICATIONS

IPEA/EP, Second Written Opinion of the International Preliminary Examining Authority, Int'l App. No. PCT/US2015/042403, Jun. 29, 2016, European Patent Office, Munich, DE, 6 pgs.

\* cited by examiner

ACCESS CLASS BARRING FOR DEVICE-TO-DEVICE PROXIMITY SERVICE COMMUNICATIONS

CROSS REFERENCES

The present Application for Patent claims priority to U.S. Provisional Patent Application No. 62/035,860 by Zisimopoulos et al., entitled "Access Class Barring for Device-to-Device Proximity Service Communications," filed Aug. 11, 2014, assigned to the assignee hereof, and expressly incorporated by reference herein.

BACKGROUND

Field of the Disclosure

The present disclosure, for example, relates to wireless communication systems, and more particularly to implementation of access class barring for device-to-device proximity service communications.

Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

By way of example, a wireless multiple-access communication system may include a number of base stations, each simultaneously supporting communication for multiple communication devices, otherwise known as user equipments (UEs). A base station may communicate with UEs on downlink channels (e.g., for transmissions from a base station to a UE) and uplink channels (e.g., for transmissions from a UE to a base station). UEs may be assigned an access class parameter associated with barring protocols that control access to the base station in certain emergency scenarios, for example. Normal (or non-high priority) UEs may be assigned an access class 0-9. High priority UEs may be assigned an access class 11-15. Other access classes may be assigned based on a service (e.g., audio/video telephone services, messaging services, etc.). When access class barring is active, the barring condition and assigned access class parameter may determine whether resources are available for a particular UE or service.

Device-to-device (D2D) communications involve direct wireless communications between UEs. D2D communications may provide for proximity service functions to be performed between UEs within the same geographic area. Example proximity service functions may include announcements within a defined geographic area, sale information within a shopping mall, etc. UEs may communicate via D2D proximity service communications by accessing resources associated with direct discovery, direct communications, etc. Current access class barring procedures may not consider D2D proximity service communications and, therefore, UEs may experience difficulty, or be prevented from, accessing resources for D2D proximity service communications when access class barring is active.

SUMMARY

The described features generally relate to one or more improved systems, methods, and/or apparatuses for access class barring (ACB) procedures for D2D proximity service communications. In some examples, an access class is provided for D2D proximity service communications. The access class may include ACB parameters associated with, for example, direct discovery for normal priority UEs, direct discovery for high priority UEs, direct communication for normal priority UEs, and/or direct communications for high priority UEs. The ACB parameters may be assigned and provided to the UEs from a serving cell in a message, e.g., a type 2 SIB. The UEs may identify available resources based on the assigned ACB parameter, e.g., depending on whether barring is active or not active and, when active, the barring condition and the assigned ACB parameter. When resources are available, e.g., discovery or communication resources, the UEs may request the resource by sending a radio resource control (RRC) connection request message having an establishment cause associated with the assigned ACB parameter.

In a first set of illustrative examples, a method for wireless communications is provided. The method may include: receiving a message from a serving cell, the message comprising information indicative of an access class barring (ACB) parameter for device-to-device (D2D) proximity service communications; and identifying, based at least in part on the ACB parameter, a resource availability for D2D proximity service communications.

In some aspects, the ACB parameter may be associated with non-high priority mobile devices and the resource may be associated with discovery operations for D2D proximity service communications. The ACB parameter may be associated with non-high priority mobile devices and the resource may be associated with communication operations for D2D proximity service communications. The ACB parameter may be associated with high priority mobile devices and the resource may be associated with discovery operations for D2D proximity service communications. The ACB parameter may be associated with high priority mobile devices and the resource may be associated with communication operations for D2D proximity service communications.

In some aspects, the method may include processing the message received from the serving cell while in a radio resource control (RRC) idle mode or an RRC connected mode. The message may include a system information block (SIB) conveying the ACB parameter. The SIB may be a type 2 SIB.

In some aspects, the method may include: determining an establishment cause associated with the D2D proximity service communications; and sending, to the serving cell, a radio resource control (RRC) connection establishment message comprising the establishment cause to request the available resource. The establishment cause may be associated with a non-high priority mobile device and the requested resource may be associated with discovery operations for D2D proximity service communications. The establishment cause may be associated with a non-high priority mobile device and the requested resource may be associated with communication operations for D2D proximity service communications. The establishment cause may be associated with a high priority mobile device and the requested resource may be associated with discovery operations for D2D proximity service communications. The establishment cause may be associated with a high priority mobile device and the requested resource may be associated with communication operations for D2D proximity service communications.

In some aspects, the method may include: determining that ACB may be active for D2D proximity service communications; and refraining from processing a subsequent message from the serving cell, the subsequent message comprising information associated with a pool of resources for D2D proximity service communications. The pool of resources may be associated with discovery operations for D2D proximity service communications. The method may include processing the message received from the serving cell while in a radio resource control (RRC) idle mode or an RRC connected mode. The subsequent message may include a type 17 system information block (SIB).

In some aspects, the method may include: determining, by a radio resource control (RRC) protocol on a mobile device, that ACB may be active for D2D proximity service communications; and communicating, to a protocol on the mobile device, an indication that D2D proximity service communications are barred. The message may include a system information block (SIB) comprising information indicating that ACB may be active. The SIB may be a type 2 SIB. The protocol may be a proximity service protocol and communicating the indication that D2D proximity service communications are barred may include: communicating an indication to the proximity service protocol that discovery operations for D2D proximity service communications are barred. The mobile device may be in an RRC idle mode or an RRC connected mode. The protocol may be a proximity service protocol and communicating the indication that D2D proximity service communications are barred may include: receiving a service request message from the proximity service protocol; and communicating an indication to the proximity service protocol that discovery operations for D2D proximity service communications are barred. The mobile device may be in an RRC idle mode or an RRC connected mode.

In some aspects, the protocol may be a non-access stratum (NAS) protocol and communicating the indication that D2D proximity service communication are barred may include: receiving a service request message from the NAS protocol on the mobile device; and communicating a service request reject message to the NAS protocol indicating that communication operations for D2D proximity service communications are barred. The mobile device may be in an RRC idle mode.

In some aspects, the method may include determining, by a radio resource control (RRC) protocol on a mobile device, that ACB may be active for D2D proximity service communications. The resource may be a discovery operation resource for D2D proximity service communications, may include removing information associated with radio resources for the discovery operation. The mobile device may be in an RRC idle mode or an RRC connected mode. The resource may be a communication operation resource for D2D proximity service communications, which may include refraining from sending a buffer status report for D2D proximity service communications. The mobile device may be in an RRC connected mode.

In some aspects, the resource may be a communication operation resource for D2D proximity service communications, which may include removing information associated with radio channel parameters for the communication operation resource. The mobile device may be in an RRC idle mode or an RRC connected mode.

In a second set of illustrative examples, an apparatus for wireless communications is provided. The apparatus may include: a processor; memory in electronic communication with the processor; and instructions being stored in the memory. The instructions being executable by the processor to: receive a message from a serving cell, the message comprising information indicative of an access class barring (ACB) parameter for device-to-device (D2D) proximity service communications; and identify, based at least in part on the ACB parameter, a resource availability for D2D proximity service communications.

In some aspects, the ACB parameter may be associated with non-high priority mobile devices and the resource may be associated with discovery operations for D2D proximity service communications. The ACB parameter may be associated with non-high priority mobile devices and the resource may be associated with communication operations for D2D proximity service communications. The ACB parameter may be associated with high priority mobile devices and the resource may be associated with discovery operations for D2D proximity service communications. The ACB parameter may be associated with high priority mobile devices and the resource may be associated with communication operations for D2D proximity service communications.

In some aspects, the apparatus may include instructions executable by the processor to: process the message received from the serving cell while in a radio resource control (RRC) idle mode or an RRC connected mode. The message may include a system information block (SIB) conveying the ACB parameter. The SIB may be a type 2 SIB.

In some aspects, the apparatus may include instructions executable by the processor to: determine an establishment cause associated with the D2D proximity service communications; and send, to the serving cell, a radio resource control (RRC) connection establishment message comprising the establishment cause to request the available resource. The establishment cause may be associated with a non-high priority mobile device and the requested resource may be associated with discovery operations for D2D proximity service communications. The establishment cause may be associated with a non-high priority mobile device and the requested resource may be associated with communication operations for D2D proximity service communications. The establishment cause may be associated with a high priority mobile device and the requested resource may be associated with discovery operations for D2D proximity service communications. The establishment cause may be associated with a high priority mobile device and the requested resource may be associated with communication operations for D2D proximity service communications.

In some aspects, the apparatus may include instructions executable by the processor to: determine that ACB may be active for D2D proximity service communications; and refrain from processing a subsequent message from the serving cell, the subsequent message comprising information associated with a pool of resources for D2D proximity service communications. The pool of resources may be associated with discovery operations for D2D proximity service communications. The apparatus may include instructions executable by the processor to process the message received from the serving cell while in a radio resource control (RRC) idle mode or an RRC connected mode. The subsequent message may include a type 17 system information block (SIB).

In some aspects, the apparatus may include instructions executable by the processor to: determine, by a radio resource control (RRC) protocol on a mobile device, that ACB may be active for D2D proximity service communications; and communicate, to a protocol on the mobile device, an indication that D2D proximity service communications are barred.

In a third set of illustrative examples, an apparatus for wireless communications is provided. The apparatus may include: means for receiving a message from a serving cell, the message comprising information indicative of an access class barring (ACB) parameter for device-to-device (D2D) proximity service communications; and means for identifying, based at least in part on the ACB parameter, a resource availability for D2D proximity service communications.

In some aspects, the ACB parameter may be associated with non-high priority mobile devices and the resource may be associated with discovery operations for D2D proximity service communications. The ACB parameter may be associated with non-high priority mobile devices and the resource may be associated with communication operations for D2D proximity service communications. The ACB parameter may be associated with high priority mobile devices and the resource may be associated with discovery operations for D2D proximity service communications. The ACB parameter may be associated with high priority mobile devices and the resource may be associated with communication operations for D2D proximity service communications.

In some aspects, the apparatus may include means for processing the message received from the serving cell while in a radio resource control (RRC) idle mode or an RRC connected mode. The message may include a system information block (SIB) conveying the ACB parameter. The SIB may be a type 2 SIB.

In some aspects, the apparatus may include: means for determining an establishment cause associated with the D2D proximity service communications; and means for sending, to the serving cell, a radio resource control (RRC) connection establishment message comprising the establishment cause to request the available resource.

In a fourth set of illustrative examples, a non-transitory computer-readable medium storing computer executable code for wireless communication is provided. The code may be executable by a processor to: receive a message from a serving cell, the message comprising information indicative of an access class barring (ACB) parameter for device-to-device (D2D) proximity service communications; and identify, based at least in part on the ACB parameter, a resource availability for D2D proximity service communications.

In a fifth set of illustrative examples, a method of wireless communications is provided. The method may include: determining an access class barring (ACB) parameter for device-to-device (D2D) proximity service communications; and sending a message to at least one mobile device, the message comprising information indicative of the ACB parameter for D2D proximity service communications.

In some aspects, the ACB parameter may include an ACB parameter for one or more of a discovery operation for non-high priority mobile devices, a communication operation for non-high priority mobile devices, a discovery operation for high priority mobile devices, and a communication operation for high priority mobile devices. The method may include receiving a message from at least one mobile device requesting an available resource for D2D proximity service communications. The message may include a radio resource control (RRC) connection request message. The RRC connection request message may include a connection establishment clause based on one or more of a discovery operation for non-high priority mobile devices, a communication operation for non-high priority mobile devices, a discovery operation for high priority mobile devices, and a communication operation for high priority mobile devices.

In some aspects, the method may include: determining that ACB may be active; and removing a resource associated with D2D proximity service communications. Removing the resource may include: refraining from sending an indication of the resource in a subsequent message to one or more mobile devices. The message may include a system information block (SIB) conveying the ACB parameter. The SIB may be a type 2 SIB. The subsequent message may include a type 17 system information block (SIB).

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Currently, a UE desiring to participate in D2D proximity service communications may be denied access to resources based on a barring condition that may not consider the nature of the desired resource, e.g., for D2D proximity service communications. Existing protocols may also provide for inconsistent resource allocations when access barring is active. For example, a UE performing discovery and/or communication operations using resources assigned by a serving base station may be barred from accessing resources when access barring is active. A UE performing discovery and/or communication operations may, however, access a non-UE specific pool of resources based on information conveyed in a system information block (SIB) while access barring is active. Accordingly, current access barring procedures do not consider D2D proximity service communications and may, in certain situations, result in inconsistent results for UEs accessing resources for D2D proximity service communications.

According to aspects of the present description, ACB parameters are defined and provided to UEs for D2D proximity service communications. The ACB parameters may be defined for discovery resources for normal and high priority UEs, for communication resources for normal and high priority UEs, etc. The ACB parameters may be communicated to the UE by a serving base station, for example. The UE may identify the availability of resources based on the assigned ACB parameters. For example, when access class barring is active, the UE may identify the availability of a resource based on the assigned ACB parameters and the barring condition, e.g., an emergency situation. The UE may request a resource identified as available by sending an RRC connection request (or establishment message) to the serving base station. The RRC connection request message may include an establishment cause that corresponds to the assigned ACB parameters, e.g., discovery operations for normal and high priority UEs and communication operations for normal and high priority UEs. Accordingly, the serving base station may allocate resources during access class barring scenarios for D2D proximity service communications.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Figure 1:
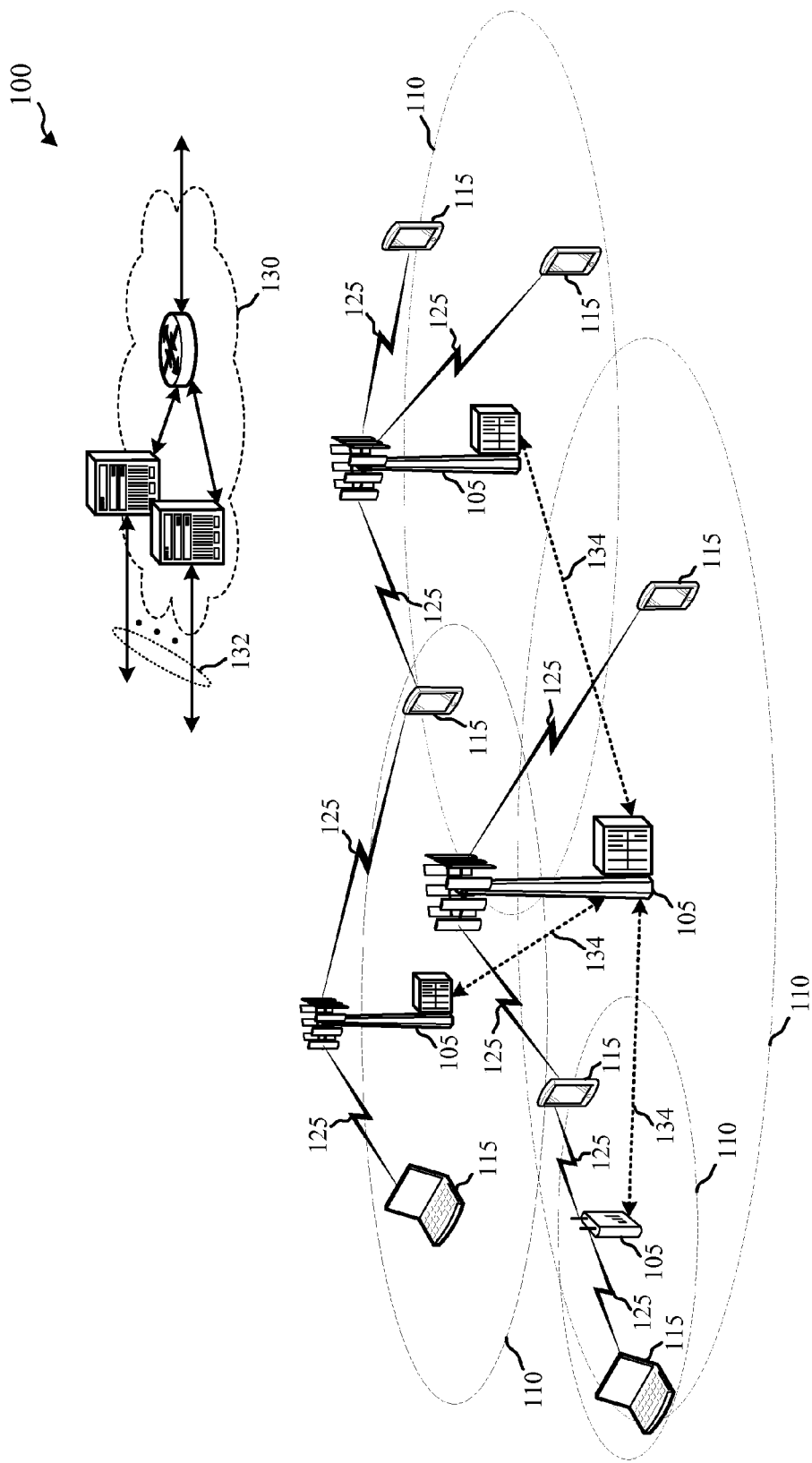
FIG. 1 shows a block diagram of a wireless communication system, in accordance with various aspects of the present disclosure.

FIG. 1 illustrates an example of a wireless communications system 100 in accordance with various aspects of the disclosure. The wireless communications system 100 includes base stations 105, UEs 115, and a core network 130. The core network 130 may provide user authentication, access authorization, tracking, Internet Protocol (IP) connectivity, and other access, routing, or mobility functions. The base stations 105 interface with the core network 130 through backhaul links 132 (e.g., S1, etc.) and may perform radio configuration and scheduling for communication with the UEs 115, or may operate under the control of a base station controller (not shown). In various examples, the base stations 105 may communicate, either directly or indirectly (e.g., through core network 130), with each other over backhaul links 134 (e.g., X1, etc.), which may be wired or wireless communication links.

The base stations 105 may wirelessly communicate with the UEs 115 via one or more base station antennas. Each of the base station 105 sites may provide communication coverage for a respective geographic coverage area 110. In some examples, base stations 105 may be referred to as a base transceiver station, a radio base station, an access point, a radio transceiver, a NodeB, eNodeB (eNB), Home NodeB, a Home eNodeB, or some other suitable terminology. The geographic coverage area 110 for a base station 105 may be divided into sectors making up only a portion of the coverage area (not shown). The wireless communications system 100 may include base stations 105 of different types (e.g., macro and/or small cell base stations). There may be overlapping geographic coverage areas 110 for different technologies.

In some examples, the wireless communications system 100 is an LTE/LTE-A network. In LTE/LTE-A networks, the term evolved Node B (eNB) may be generally used to describe the base stations 105, while the term UE may be generally used to describe the UEs 115. The wireless communications system 100 may be a Heterogeneous LTE/LTE-A network in which different types of eNBs provide coverage for various geographical regions. For example, each eNB or base station 105 may provide communication coverage for a macro cell, a small cell, and/or other types of cell. The term "cell" is a 3GPP term that can be used to describe a base station, a carrier or component carrier associated with a base station, or a coverage area (e.g., sector, etc.) of a carrier or base station, depending on context.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communications system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARD) to provide retransmission at the MAC layer to improve link efficiency. In the control plane, the Radio Resource Control (RRC) protocol layer may provide establishment, configuration, and maintenance of an RRC connection between a UE 115 and the base stations 105 or core network 130 supporting radio bearers for the user plane data. At the Physical (PHY) layer, the transport channels may be mapped to Physical channels.

The UEs 115 are dispersed throughout the wireless communications system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE 115 may be able to communicate with various types of base stations and network equipment including macro eNBs, small cell eNBs, relay base stations, and the like. A UE 115 may also be able to communicate with other UEs either within or outside the same coverage area of a base station via D2D communications, e.g., for proximity service communication functions. A UE 115 may be able to communicate with other UEs via a PC5 air interface (PC5 reference point as described in 3rd Generation Partnership Project, Technical Specification 23.303, for example) that carries proximity service application codes for direction discovery and proximity service encapsulated internet protocol (IP) packets for direct communications. Similarly, a UE 115 may be able to communicate with a proximity service function via a PC3 over IP reference point protocol to distribute an authorization policy for direct discovery and perform allocation/resolution of codes corresponding to proximity service application identities used for direct discovery.

The communication links 125 shown in wireless communications system 100 may include uplink (UL) transmissions from a UE 115 to a base station 105, and/or downlink (DL) transmissions, from a base station 105 to a UE 115. The downlink transmissions may also be called forward link transmissions while the uplink transmissions may also be called reverse link transmissions. Each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using FDD (e.g., using paired spectrum resources) or TDD operation (e.g., using unpaired spectrum resources). Frame structures for FDD (e.g., frame structure type 1) and TDD (e.g., frame structure type 2) may be defined.

In some embodiments of the system 100, base stations 105 and/or UEs 115 may include multiple antennas for employing antenna diversity schemes to improve communication quality and reliability between base stations 105 and UEs 115. Additionally or alternatively, base stations 105 and/or UEs 115 may employ multiple-input, multiple-output (MIMO) techniques that may take advantage of multi-path environments to transmit multiple spatial layers carrying the same or different coded data.

Wireless communication system 100 may support access class barring operations for D2D proximity service communications. A base station 105 may, alone or in cooperation with one or more other network entity, determine and convey an ACB parameter for UEs 115 within its coverage area. The ACB parameter may correspond to normal/high priority UEs for discovery/communication operations associated with D2D proximity service communications. The ACB parameter may be conveyed to the UEs in a type 2 SIB, for example. The UEs may identify whether a resource is available based on the assigned ACB parameter. For example, when access class barring is active, the UE may identify the resource based on the barring condition/restrictions and its assigned ACB parameter. If the barring restrictions prohibits resource allocation for the assigned ACB parameter, the UE may determine that no resources are available. If the resource allocation is not barred, the UE may determine that a resource is available and may then send a request to its serving base station 105 requesting the resource. The request may be an RRC connection request message that includes an establishment cause defined based on D2D proximity service communications, e.g., corresponding to the assigned ACB parameter.

Figure 2:
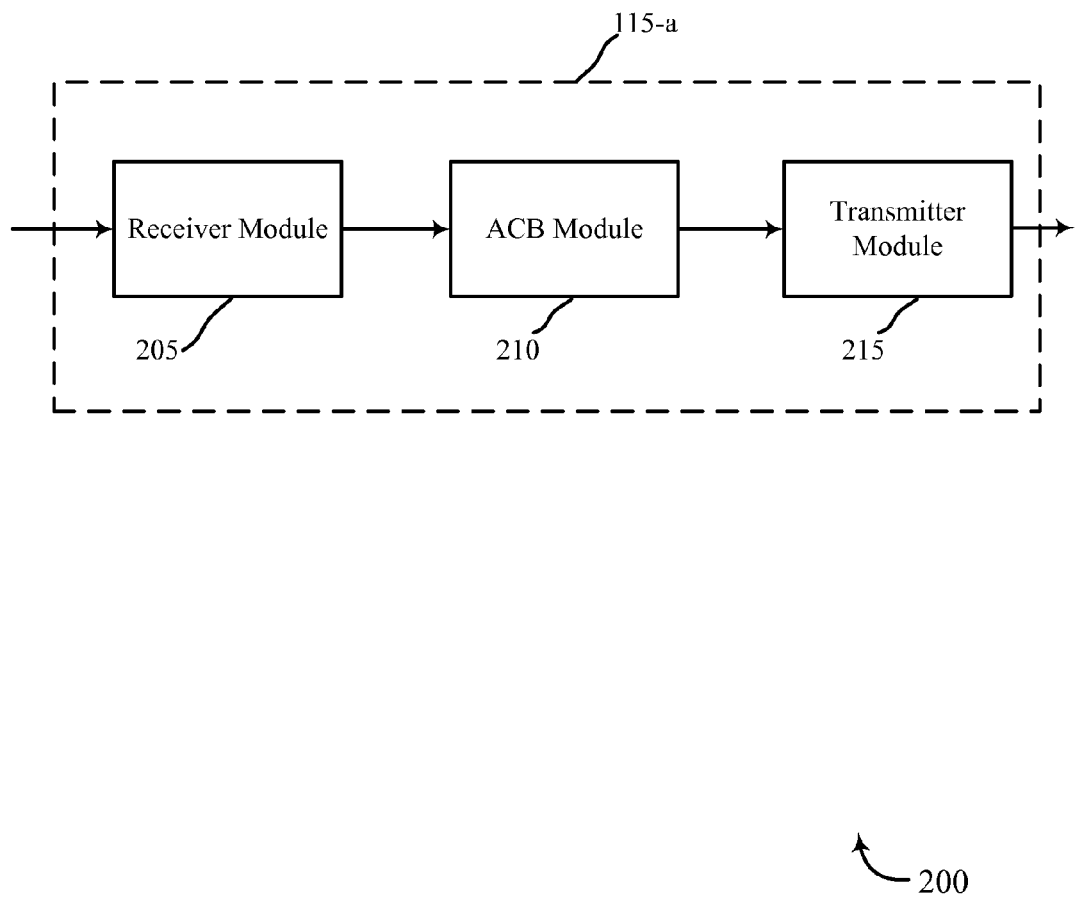
FIG. 2 shows a block diagram of a device configured for use in wireless communication, in accordance with various aspects of the present disclosure.

FIG. 2 shows a block diagram 200 of a device 115-a for use in wireless communication, in accordance with various aspects of the present disclosure. The device 115-a may be an example of one or more aspects of a UE 115 described with reference to FIG. 1. The device 115-a may include a receiver module 205, an access class barring (ACB) module 210, and/or a transmitter module 215. The device 115-a may also be or include a processor (not shown). Each of these modules may be in communication with each other.

The components of the device 115-a may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented, in whole or in part, with instructions embodied in a memory, formatted to be executed by one or more general or application-specific processors.

The receiver module 205 may receive information such as packets, user data, and/or control information associated with various information channels (e.g., control channels, data channels, etc.). The receiver module 205 may receive messages from a serving base station including information associated with access class barring operations for D2D proximity service communications. The receiver module 205 may also receive signals from a different UE, via D2D communications, that include information or are otherwise associated with proximity service communications, e.g., discovery signals, communications, etc. Information may be passed on to the ACB module 210, and to other components of the device 115-a.

The ACB module 210 may manage access class barring operations for the device 115-a. The ACB module 210 may receive a message, via the receiver module 205, from a serving cell that includes an ACB parameter assigned to the device 115-a. The ACB module 210 may identify or otherwise determine whether a resource is available for D2D proximity service communications based on the assigned ACB parameter. For example, the ACB module 210 may determine whether access class barring is active or inactive and, when activated, whether the barring condition and assigned ACB parameter would provide resource availability for D2D proximity service communications. When resources for D2D proximity service communication are identified as available, the ACB module 210 may send, via the transmitter module 215, a message to the serving cell requesting the available resource.

The transmitter module 215 may transmit the one or more signals received from other components of the device 115-a. The transmitter module 215 may transmit information such as packets, user data, and/or control information to a serving cell. The transmitter module 215 may send messages to the serving cell in conjunction with access class barring operations. The transmitter module 215 may also send signals to a different UE via D2D communications for proximity service communications. In some examples, the transmitter module 215 may be collocated with the receiver module 205 in a transceiver module.

Figure 3:
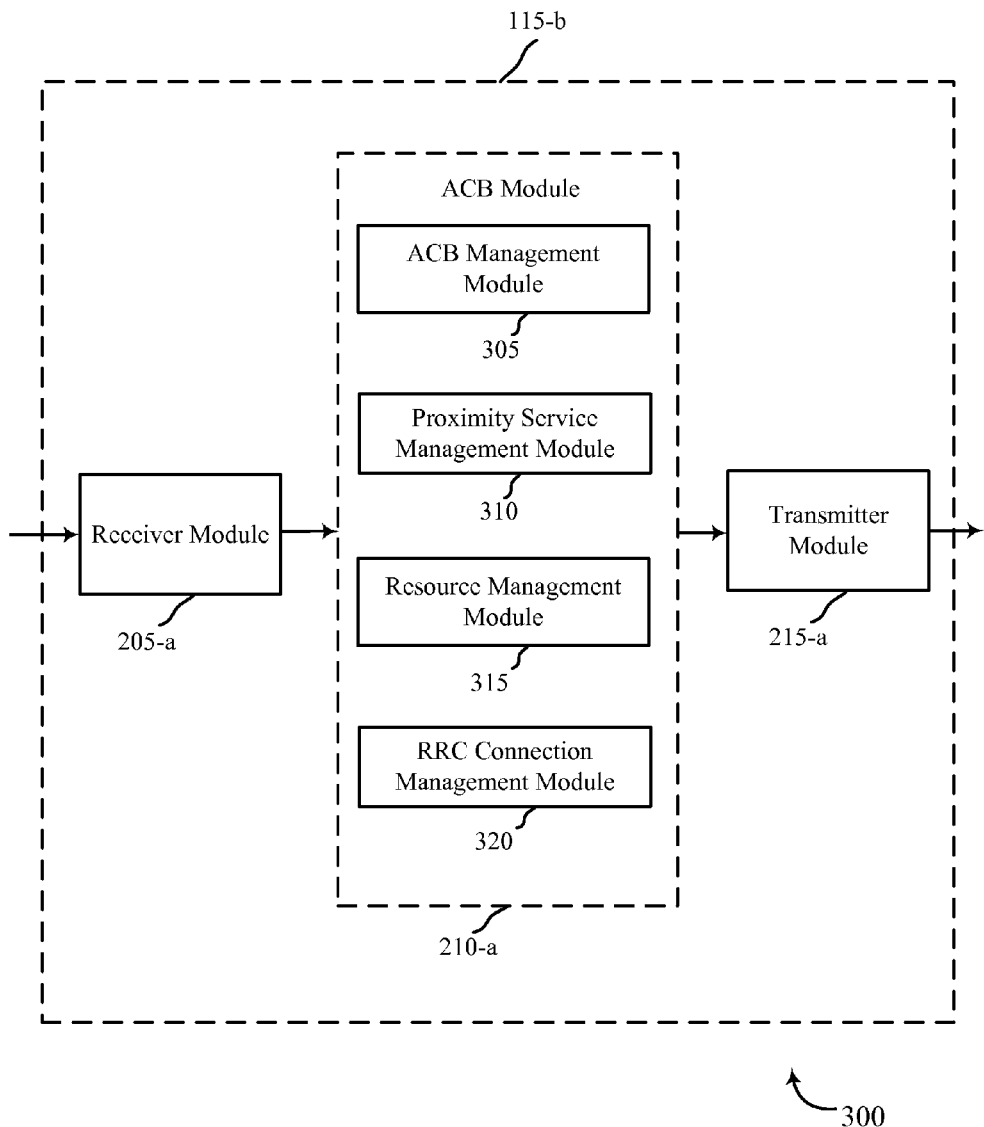
FIG. 3 shows a block diagram of a device configured for use in wireless communication, in accordance with various aspects of the present disclosure.

FIG. 3 shows a block diagram 300 of a device 115-b for use in wireless communication, in accordance with various examples. The device 115-b may be an example of one or more aspects of a UE 115 described with reference to FIG. 1. It may also be an example of a device 115-a described with reference to FIG. 2. The device 115-b may include a receiver module 205-a, an ACB module 210-a, and/or a transmitter module 215-a, which may be examples of the corresponding modules of device 115-a. The device 115-b-a may also include a processor (not shown). Each of these components may be in communication with each other. The ACB module 210-a may include an ACB management module 305, a proximity service management module 310, a resource management module 315 and an RRC connection management module 320. The receiver module 205-a and the transmitter module 215-a may perform the functions of the receiver module 205 and the transmitter module 215, of FIG. 2, respectively.

The components of the device 115-b may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented, in whole or in part, with instructions embodied in a memory, formatted to be executed by one or more general or application-specific processors.

The ACB management module 305 may manage aspects of access class barring operations for the device 115-b. The ACB management module 305 may receive an ACB parameter from a serving cell. The ACB parameter may assign the device 115-b, with respect to access class barring operations, as one or more of a normal priority UE for discovery operations or communication operations, or the ACB parameter may assign the device 115-b as a high priority UE for discovery operations and communication operations. The ACB management module 305 may, for example, process a system information block (SIB) received from the serving cell to determine the assigned ACB parameter. The ACB management module 305 may also determine whether access class barring operations are active or inactive. When active, the ACB management module 305 may determine the barring condition associated with the active barring operations, e.g., the emergency condition. The ACB management module 305 may, accordingly, determine or otherwise control a state transition for the device 115-b from an unbarred state to a barred state. The ACB management module 305 may output information to the components of the ACB module 210-a indicative of the barred/unbarred state, the assigned ACB parameter, and the barring condition, when applicable.

The proximity service management module 310 may manage proximity service operations for the device 115-b. For example, the proximity service management module 310 may include, or communicate with, one or more proximity service protocols of the device 115-b. The proximity service management module 310 may, in cooperation with the proximity service protocol(s), output proximity service application codes (periodically and without D2D signaling) for direct discovery services for D2D proximity service communications. Additionally, the proximity service management module 310 may, in cooperation with one or more other components of the device 115-b, output encapsulated IP packets for direct communication for D2D proximity service communications.

The proximity service management module 310 may, in cooperation with the receiver module 205-a and/or the transmitter module 215-a, receive and/or send one or more discovery request (announce) signals for D2D proximity service communications. When sending the announce signal, the proximity service management module 310 may coordinate with the ACB management module 305, the resource management module 315, and/or the RRC connection management module 320 to utilize an identified and requested resource to send the announcement. The discovery announce message may include an application code for proximity service communications.

The resource management module 315 may manage aspects of resource identification, requesting, and/or control for D2D proximity service communications. In some examples, the resource management module 315 may determine whether type 1 or type 2 resources are associated with direct discovery operations. For type 1, resources may be allocated on a non-UE specific basis, e.g., via signaling in SIB17. For example, a serving cell may provide UEs within its coverage area with a resource pool to be used for announcing proximity service application codes. The serving cell may signal information associated with the resource pool in a SIB when the device 115-b is in an RRC idle mode and via non-access stratum (NAS) signaling when the device 115-b is in an RRC connected mode. The resource management module 315 may randomly select a radio resource from the resource pool and use the selected radio resource to send the announcement. For type 2, resources may be allocated on a per-UE specific basis when the UE is in an RRC connected mode. For example, a serving cell may signal resources via RRC signaling while in the RRC connected mode. When the UE transitions to an RRC idle mode, the UE-specific resource may be released.

The resource management module 315 may determine whether mode 1 or mode 2 resources are associated with direct communication operations. For mode 1, communication resources are allocated on a UE-specific basis when the UE is in an RRC connected mode.

The UE may request resources from the serving cell and the serving cell may respond with resources for the transmission of scheduling assignment(s) and data. The UE may request the resources by sending a scheduling request (SR) or random access message to the serving cell and a buffer status report (BSR). The BSR may convey information indicative of the data the UE needs to send and may also include an indication that the UE has data for direct communication in proximity service communications and determine the resources needed. For mode 2, communication resources may be allocated on a non-UE specific basis. For example, the UE may randomly access a pool of resources assigned for transmitting scheduling assignment and data. The serving cell may allocate and configure the resources.

The resource management module 315 may identify, based on the ACB parameter, a resource for D2D proximity service communications. For example, the resource management module 315 may receive an indication from the ACB management module 305 of the assigned ACB parameter and whether barring operations are active. The resource management module 315 may receive an indication from the proximity service management module 310 of the proximity service function requirements, e.g., direct discovery, direct communications, etc. The resource management module 315 may identify whether a resource is available based on the received indications, the RRC connection mode, and the current configuration for discovery/communication resource allocation (type 1/mode 2 or type 2/mode 1). If a resource is identified as available, the resource management module 315 may coordinate with the RRC connection management module 320 to request the available resource.

The RRC connection management module 320 may manage aspects of RRC functionality for the device 115-b. For example, the RRC connection management module 320 may manage RRC connections for the device 115-b and output information indicative of the current RRC connection mode, e.g., connected or idle. The RRC connection management module 320 may receive an indication from the resource management module 315, for example, that a resource is available and request the resource from the serving cell. For example, the RRC connection management module may send, via the transmitter module 215-a, an RRC connection request message to the serving cell that includes an establishment cause associated with D2D proximity service communications. The establishment cause may be associated with the assigned ACB parameter. Exemplary establishment causes include, but are not limited to, D2D-discovery to establish a connection for direct discovery for a normal priority UE, D2D-communication to establish a connection for direct communication for a normal priority UE, D2D-discoveryhighprio to establish a connection for direct discovery for a high priority UE, and/or D2D-communication-highprio to establish a connection for direct communication for a high priority UE. The serving cell may, accordingly, assign the resource to the device 115-b for D2D proximity service communications based on the current barring operation status, barring condition, and establishment cause.

Figure 4:
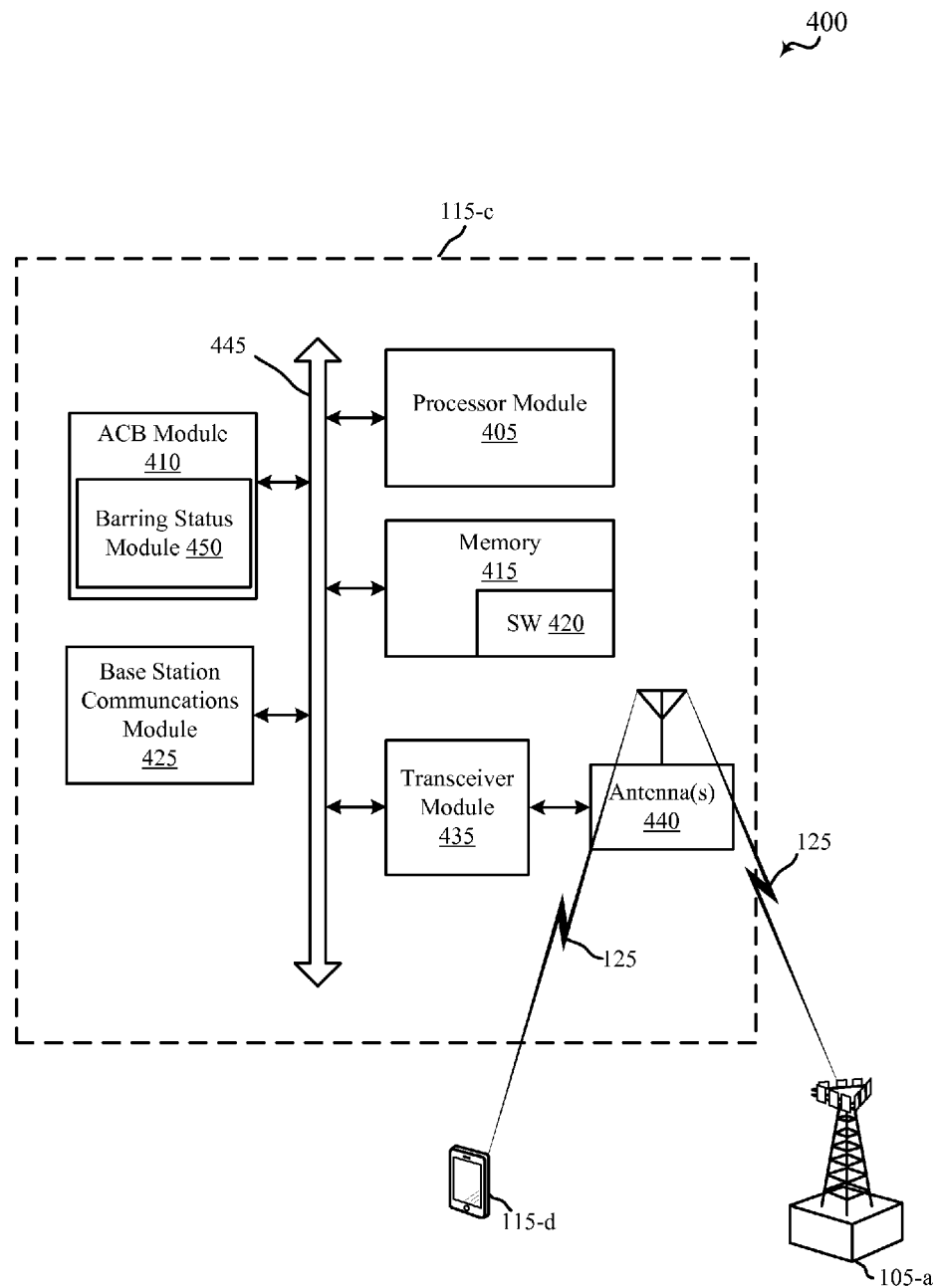
FIG. 4 shows a block diagram of a wireless communication system, in accordance with various aspects of the present disclosure.

FIG. 4 shows a system 400 for use in wireless communication, in accordance with various examples. System 400 may include a UE 115-c, which may be an example of the UEs 115 of FIG. 1. UE 115-c may also be an example of one or more aspects of devices 115 of FIGS. 2 and 3.

The UE 115-c may generally include components for bi-directional voice and data communications including components for transmitting communications and components for receiving communications. The UE 115-c may include antenna(s) 440, a transceiver module 435, a processor module 405, and memory 415 (including software (SW) 420), which each may communicate, directly or indirectly, with each other (e.g., via one or more buses 445). The transceiver module 435 may communicate bi-directionally, via the antenna(s) 440 and/or one or more wired or wireless links, with one or more networks, as described above. For example, the transceiver module 435 may communicate bi-directionally with base stations 105, with other UEs 115, and/or with devices 115 with reference to FIG. 1, 2, or 3. The transceiver module 435 may include a modem to modulate the packets and provide the modulated packets to the antenna(s) 440 for transmission, and to demodulate packets received from the antenna(s) 440. While the UE 115-c may include a single antenna 440, the UE 115-c may have multiple antennas 440 capable of concurrently transmitting and/or receiving multiple wireless transmissions. The transceiver module 435 may be capable of concurrently communicating with one or more base stations 105 via multiple component carriers.

The UE 115-c may include an ACB module 410, which may perform the functions described above for the ACB module 210 of devices 115 of FIGS. 2 and 3. The UE 115-c may also include a barring status module 450. The barring status module 450 may monitor, control, and/or otherwise manage aspects of barring operations for the UE 115-c for D2D proximity service communications. The barring status module 450 may determine a barring status for a serving cell of the UE 115-c, an ACB parameter for the device 115-c associated with D2D proximity service communications, a proximity service protocol application code, and an RRC connection mode for the device 115-c. The barring status module 450 may identify and/or request an available resource for D2D proximity service communications from a serving cell, e.g., base station 105-a. The resource may be identified based on the assigned ACB parameter and the barring condition. The resource may be utilized for D2D communications with the UE 115-d, for example, for one or more proximity service functions.

In some examples, the barring status module 450 may manage state transitions for the UE 115-c. During barring operations, the UE 115-*c* may transition from a barred state to an unbarred state, and vice versa. The barring status module 450 may enforce one or more provisions related to transition state management via upper layers, e.g., instruct an upper layer protocol not to send data when a barring operation indicates that D2D proximity service communications are barred. For unbarred to barred transitions, the barring status module 450 may, for type 1 discovery operations, remove radio resource information from a media access controller (MAC) when an SIB 1 message removes resources otherwise allocated. This may be performed when the UE 115-*c* is in an RRC connected mode. The barring status module 450 may, for type 2 discovery operations, remove the radio resource information when in an RRC connected mode. This may provide for a proximity service protocol to send a trigger (e.g., an indication that proximity services are pending) and an RRC protocol may reject the trigger.

The barring status module 450 may, for mode 1 communication operations, and when the UE 115-*c* is in an RRC connected mode and barring is active, control the RRC protocol to prevent the MAC protocol from sending a buffer status report. For mode 2 communication operations, the RRC protocol may remove an indication of radio resources from a MAC protocol to prevent information from being sent to the serving cell.

The memory 415 may include random access memory (RAM) and read-only memory (ROM). The memory 415 may store computer-readable, computer-executable software/firmware code 420 containing instructions that, when executed, cause the processor module 405 to perform various functions described herein (e.g., receive ACB parameter, identify availability of resource for D2D proximity service communications, request available resource for discovery and/or communication operations, etc.). Alternatively, the computer-readable, computer-executable software/firmware code 420 may not be directly executable by the processor module 405 but cause a computer (e.g., when compiled and executed) to perform functions described herein. The processor module 405 may include an intelligent hardware device, e.g., a central processing unit (CPU), a microcontroller, an application-specific integrated circuit (ASIC), etc.

Figure 5:
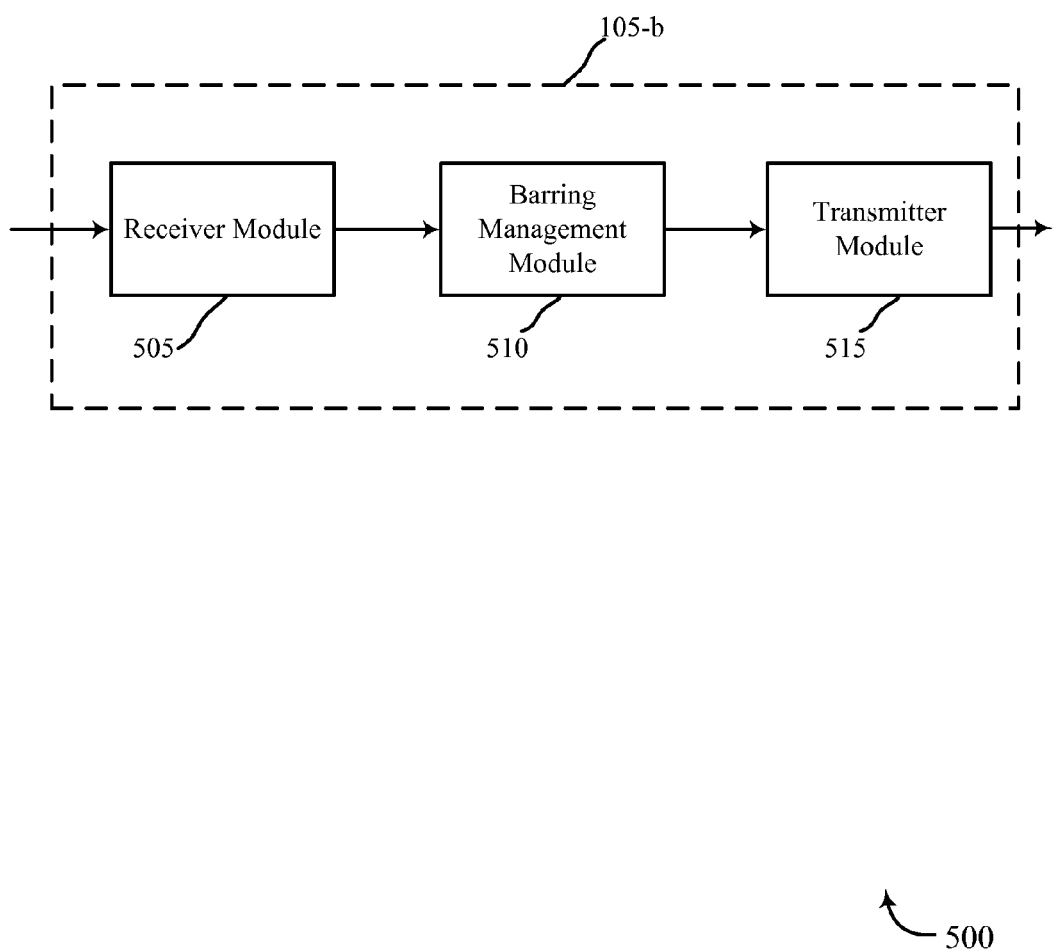
FIG. 5 shows a block diagram of an apparatus for use in wireless communication, in accordance with various aspects of the present disclosure.

FIG. 5 shows a block diagram 500 of an apparatus 105-*b* for use in wireless communication, in accordance with various aspects of the present disclosure. In some examples, the apparatus 105-*b* may be an example of aspects of one or more of the base stations 105 described with reference to FIG. 1, 2, 3, or 4. In some examples, the apparatus 105-*b* may be part or include an LTE/LTE-A eNB and/or an LTE/LTE-A base station. The apparatus 105-*b* may also be a processor. The apparatus 105-*b* may include a receiver module 505, a barring management module 510, and/or a transmitter module 515. Each of these modules may be in communication with each other.

The components of the apparatus 105-*b* may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each component may also be implemented, in whole or in part, with instructions embodied in a memory, formatted to be executed by one or more general or application-specific processors.

In some examples, the receiver module 505 may include at least one radio frequency (RF) receiver, such as an RF receiver operable to receive D2D proximity service communication related discovery and/or communication signals from a serving cell associated with barring operations for D2D proximity service communications, etc. The receiver module 505 may be used to receive various types of data and/or control signals (i.e., transmissions) over one or more communication links of a wireless communication system, such as one or more communication links of the wireless communications system 100 described with reference to FIG. 1.

In some examples, the transmitter module 515 may include at least one RF transmitter, such as at least one RF transmitter operable to transmit D2D proximity service communication related discovery and/or communication signals to a serving cell associated with resource request and barring operations for D2D proximity service communications, etc. The transmitter module 515 may be used to transmit various types of data and/or control signals (i.e., transmissions) over one or more communication links of a wireless communication system, such as one or more communication links of the wireless communications system 100 described with reference to FIG. 1.

In some examples, the barring management module 510 may manage one or more functions for barring operations for UEs participating in D2D proximity service communications. The barring management module 510 may determine an ACB parameter for UEs within the coverage area of the apparatus 105-*b* that apply to D2D proximity service communications. For example, the barring management module 510 may determine an ACB parameter for direct discovery operations for normal priority UEs, for direct communication operations for normal priority UEs, for direct discovery operations for high priority UEs, and/or for direct communication operations for high priority UEs. The barring management module 510 may communicate the ACB parameters to UEs within its coverage area via a SIB2 message, for example.

In some examples, the barring management module 510 may communicate information associated with barring operations, e.g., active barring operations. The barring management module 510 may determine whether barring is active and, if so, what barring condition is associated with the barring operations, e.g., emergency, public utilities, security services, network congestion and maintenance, etc. When barring operations are activated, the barring management module 510 may send one or more signals to the UEs within its coverage area indicating that barring is active and the associated barring condition.

In some examples, the barring management module 510 may manage one or more aspects related to resource management. For example, the barring management module 510 may allocate type 1 and/or type 2 discovery resources as well as mode 1 and/or mode 2 communication resources for D2D proximity service communications. The barring management module 510 may receive a request for resources from a UE and allocate the requested resource dependent upon the requested resource, the ACB parameter assigned to the UE, and the current barring operation status/barring condition. In some examples, the barring management module 510 may remove information associated with a radio resource in a pool of available resources from a SIB17 message when barring operations prevent allocation.

Figure 6:
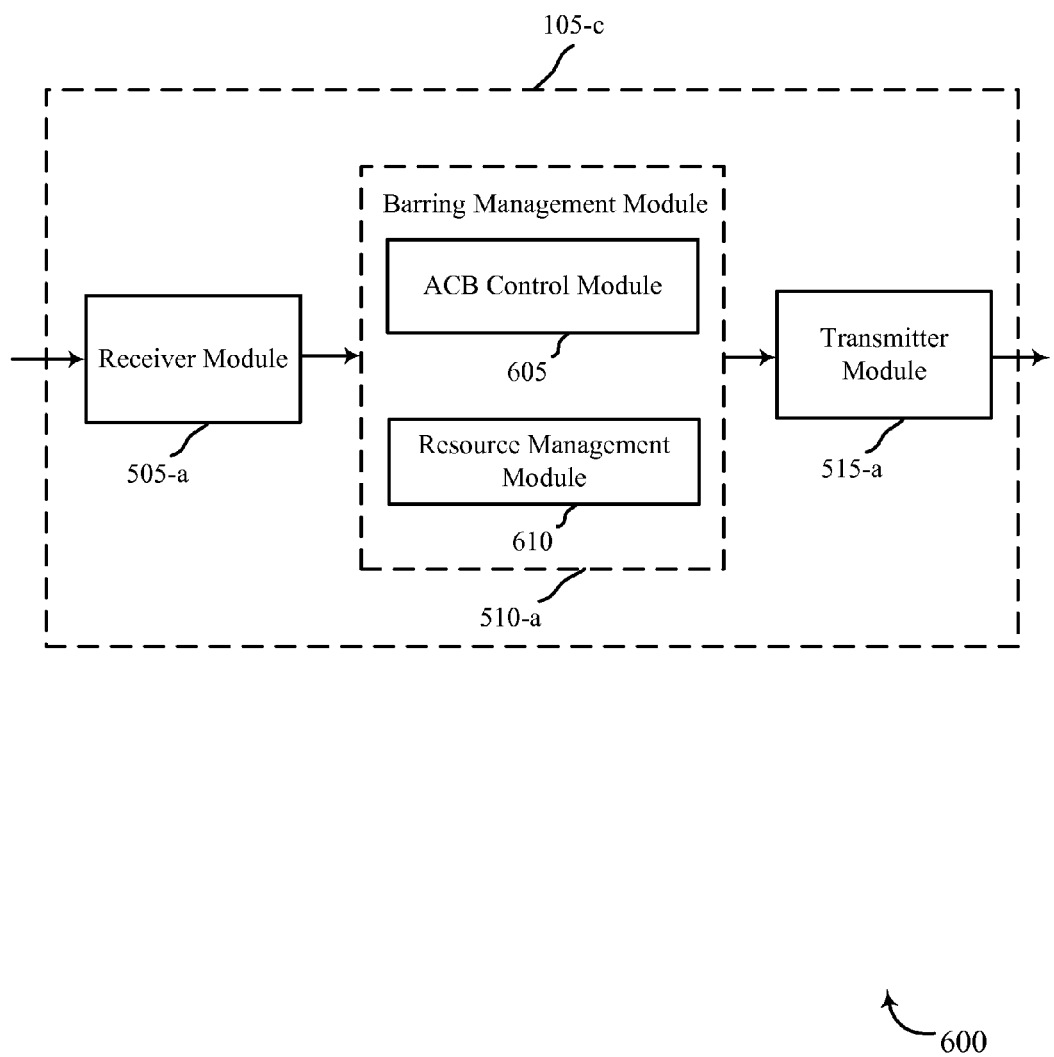
FIG. 6 shows a block diagram of an apparatus for use in wireless communication, in accordance with various aspects of the present disclosure.

FIG. 6 shows a block diagram 600 of an apparatus 105-*c* for use in wireless communication, in accordance with various aspects of the present disclosure. In some examples, the apparatus 105-c may be an example of aspects of one or more of the base stations 105 described with reference to FIG. 1, 2, 3, or 4, and/or an example of aspects of the apparatus 105-b described with reference to FIG. 5. In some examples, the apparatus 105-c may be part of or include an LTE/LTE-A eNB and/or an LTE/LTE-A base station. The apparatus 105-c may also be a processor. The apparatus 105-c may include a receiver module 505-a, a barring management module 510-a, and/or a transmitter module 515-a. Each of these modules may be in communication with each other. The barring management module 510-a may include an ACB control module 605 and a resource management module 610. The receiver module 505-a and the transmitter module 515-a may perform the functions of the receiver module 505 and the transmitter module 515 of FIG. 5, respectively.

The components of the apparatus 105-c may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each component may also be implemented, in whole or in part, with instructions embodied in a memory, formatted to be executed by one or more general or application-specific processors.

In some examples, the ACB control module 605 may manage various functions for access class barring operations for D2D proximity service communications. The ACB control module 605 may determine ACB parameters for UEs within the coverage area of the apparatus 105-c for D2D proximity service communications, e.g., ACB parameters for direct discovery and/or communication operations for normal priority UEs as well as for direct discovery/communication operations for high priority UEs. The ACB control module 605 may, in cooperation with the transmitter module 515-a, communicate the ACB parameters to UEs within its coverage area via a SIB2 message, for example. The ACB control module 605 may also determine whether barring is active and, if so, what barring condition is associated with the barring operations. When barring operations are activated, the ACB control module 605 may send one or more signals, via the transmitter module 515-a, to the UEs within its coverage area indicating that barring is active and the associated barring condition.

In some examples, the resource management module 610 may manage one or more aspects related to resource management. For example, the resource management module 610 may allocate discovery and/or communication resources for D2D proximity service communications in response to a request for resources from a UE. The resource management module 610 may allocate the requested resource dependent upon the requested resource, the ACB parameter assigned to the UE, and the current barring operation status/barring condition. In some examples, the resource management module 610 may remove information associated with a radio resource in a pool of available resources. For example, the resource management module 610 may remove information associated with a non-UE specific pool of discovery and/or communication resources communicated to UEs (e.g., in a SIB17 message). The resource management module 610 may remove the information in response to barring operations being active and the barring condition indicating that the pool of resource are not allocable to UEs.

Figure 7:
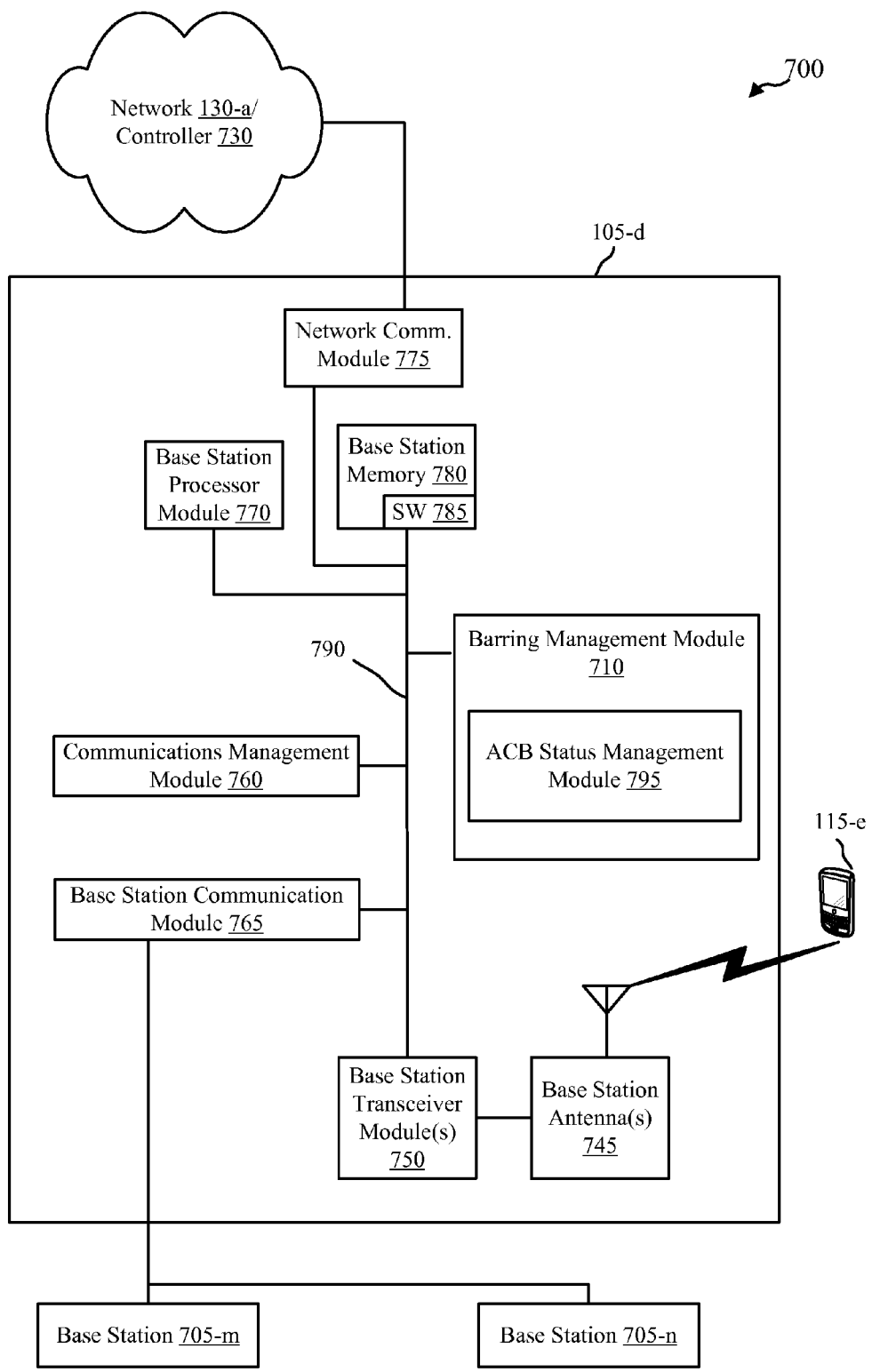
FIG. 7 shows a block diagram of a base station (e.g., a base station forming part or all of an eNB) for use in wireless communication, in accordance with various aspects of the present disclosure.

FIG. 7 shows a block diagram 700 of a base station 105-d (e.g., a base station forming part or all of an eNB) for use in wireless communication, in accordance with various aspects of the present disclosure. In some examples, the base station 105-d may be an example of aspects of one or more of the base stations 105 described with reference to FIG. 1, 2, 3, or 4, and/or aspects of one or more of the apparatus 105 when configured as a base station, as described with reference to FIGS. 5 and/or 6. The base station 105-d may implement or facilitate at least some of the base station and/or apparatus features and functions described with reference to FIG. 1, 2, 3, 4, 5, or 6.

The base station 105-d may include a base station processor module 770, a base station memory module 780, at least one base station transceiver module (represented by base station transceiver module(s) 750), at least one base station antenna (represented by base station antenna(s) 745), and/or a barring management module 710. The base station 105-d may also include one or more of a base station communications module 765 and/or a network communications module 775. Each of these modules may be in communication with each other, directly or indirectly, over one or more buses 790.

The base station memory module 780 may include random access memory (RAM) and/or read-only memory (ROM). The base station memory module 780 may store computer-readable, computer-executable software/firmware code 785 containing instructions that, when executed, cause the base station processor module 770 to perform various functions described herein related to wireless communication (e.g., determine ACB parameters for D2D proximity service communications, resource allocation for D2D proximity service communications based on current barring operations, etc.). Alternatively, the computer-readable, computer-executable software/firmware code 785 may not be directly executable by the base station processor module 770 but cause the base station 105-d (e.g., when compiled and executed) to perform various of the functions described herein.

The base station processor module 770 may include an intelligent hardware device, e.g., a central processing unit (CPU), a microcontroller, an ASIC, etc. The base station processor module 770 may process information received through the base station transceiver module(s) 750, the base station communications module 765, and/or the network communications module 775. The base station processor module 770 may also process information to be sent to the transceiver module(s) 750 for transmission through the antenna(s) 745, to the base station communications module 765, for transmission to one or more other base stations 705-m and 705-n, and/or to the network communications module 775 for transmission to a core network 730, which may be an example of one or more aspects of the core network 130 described with reference to FIG. 1. The base station processor module 770 may handle, alone or in connection with the barring management module 710, various aspects of access class barring operations for UEs participating in D2D proximity service communication operations.

The base station transceiver module(s) 750 may include a modem to modulate packets and provide the modulated packets to the base station antenna(s) 745 for transmission, and to demodulate packets received from the base station antenna(s) 745. The base station transceiver module(s) 750 may, in some examples, be implemented as one or more base station transmitter modules and one or more separate base station receiver modules. The base station transceiver module(s) 750 may support communications in a first radio frequency spectrum band and/or a second radio frequency spectrum band. The base station transceiver module(s) 750 may communicate bi-directionally, via the antenna(s) 745, with one or more UEs or apparatuses, such as one or more of the UEs 115 described with reference to FIG. 1, 2, 3, 4, 5, or 6. The base station 105-d may, for example, include multiple base station antennas 745 (e.g., an antenna array). The base station 105-d may communicate with the core network 130-a through the network communications module 775. The base station 105-d may also communicate with other base stations, such as the base stations 705-m and 705-n, using the base station communications module 765.

The barring management module 710 may perform and/or control some or all of the features and/or functions described with reference to FIG. 5 or 6 related to barring operations, e.g., ACB parameter determination and/or resource control. The barring management module 710 may include an ACB status management module 795 that performs some or all of the features and/or functions of the barring management module 795. In some examples, the ACB status management module 795 may provide ACB parameters to UEs within the coverage area of the base station 105-d and allocate resource(s) for discovery and/or communication operations for D2D proximity service communications. The barring management module 710, or portions of the module 710, may include a processor, and/or some or all of the functions of the barring management module 710 may be performed by the base station processor module 770 and/or in connection with the base station processor module 770. In some examples, the barring management module 710 may be an example of the barring management module 510 and/or 510-a described with reference to FIGS. 5 and/or 6.

Figure 8:
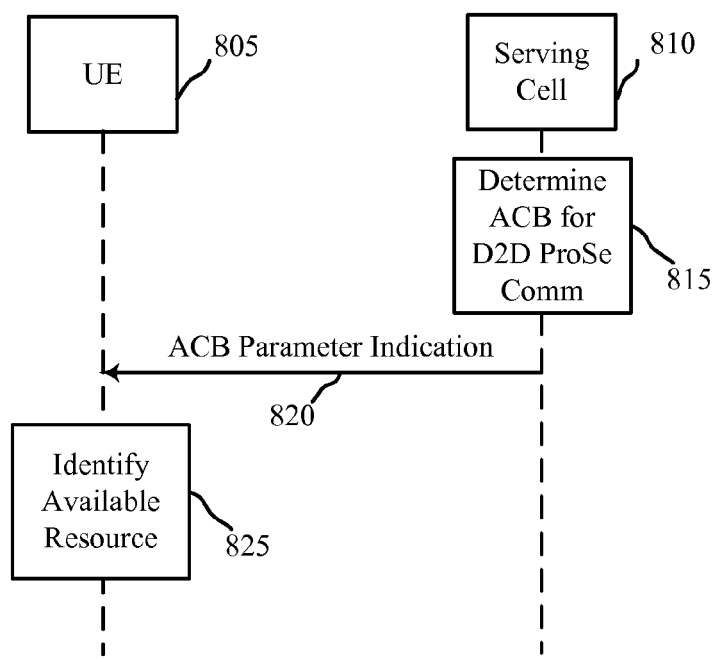
FIG. 8 shows a swim diagram illustrating aspects of D2D proximity service communications, in accordance with various aspects of the present disclosure.

FIG. 8 is a swim diagram 800 illustrating aspects of D2D proximity service communications, in accordance with various aspects of the present disclosure. The diagram 800 may illustrate aspects of the system 100, 400 and/or 700 described with reference to FIG. 1, 4, or 7, respectively. The diagram 800 includes a UE 805 and a serving cell 810. The UE 805 may be an example of one or more of the UEs 115 and/or devices 115 described above with respect to FIGS. 1, 2, 3, and/or 4. The serving cell 810 may be an example of one or more of the base stations 105 and/or apparatuses 105 described above with respect to FIGS. 1, 5, 6, and/or 7. In some examples, the serving cell 810 may be a serving cell of the UE 805. Generally, the diagram 800 illustrates aspects of implementing access class barring operations for D2D proximity service communications. In some examples, a system device, such as one of the UEs 115 and/or base stations 105 may execute one or more sets of codes to control the functional elements of the device to perform some or all of the functions described below.

At block 815, the serving cell 810 may determine an ACB parameter for UEs within its coverage area, e.g., the UE 805, for D2D proximity service communications. The ACB parameter may be associated with discovery and/or communications operations for normal priority UEs and for high priority UEs. The ACB parameter may be provided for access to certain resources of the serving cell 810 when barring operations are active and a UE requests such resources. At block 820, the serving cell 810 may transmit, communicate, or otherwise convey the ACB parameter to the UE 805. The serving cell 810 may send the ACB parameter to the UE 805 via a SIB, e.g., type 2 SIB.

At block 825, the UE 805 may process the message from the serving cell 810 and identify the availability of a resource for D2D proximity service communications. As one example, the serving cell 810 may assign an ACB parameter for discovery and communication operations for normal priority UEs to the UE 805. Accordingly, when barring is active for discovery operations for normal priority UEs, the UE 805 may determine that no resources are available and, therefore refrain from taking steps to request the resource, e.g., refrain from sending a BSR.

Figure 9:
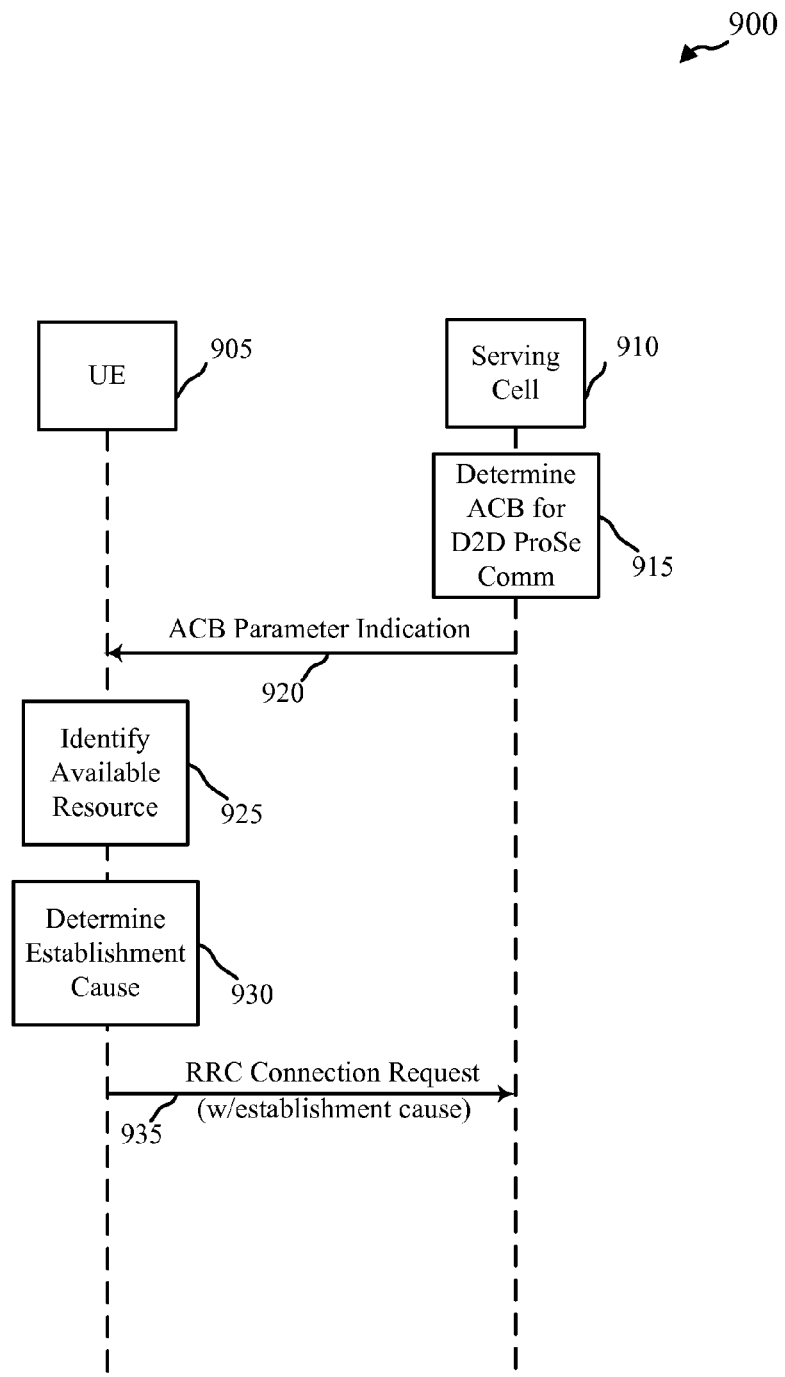
FIG. 9 shows a swim diagram illustrating aspects of D2D proximity service communications, in accordance with various aspects of the present disclosure.

FIG. 9 is a swim diagram 900 illustrating aspects of D2D proximity service communications, in accordance with various aspects of the present disclosure. The diagram 900 may illustrate aspects of the system 100, 400 and/or 700 described with reference to FIG. 1, 4, or 7, respectively. The diagram 900 includes a UE 905 and a serving cell 910. The UE 905 may be an example of one or more of the UEs 115 and/or devices 115 described above with respect to FIGS. 1, 2, 3, and/or 4. The serving cell 910 may be an example of one or more of the base stations 105 and/or apparatuses 105 described above with respect to FIGS. 1, 5, 6, and/or 7. In some examples, the serving cell 910 may be a serving cell of the UE 905. Generally, the diagram 900 illustrates aspects of implementing access class barring operations for D2D proximity service communications. In some examples, a system device, such as one of the UEs 115 and/or base stations 105 may execute one or more sets of codes to control the functional elements of the device to perform some or all of the functions described below.

At block 915, the serving cell 910 may determine an ACB parameter for UEs within its coverage area, e.g., the UE 905, for D2D proximity service communications. The ACB parameter may be associated with discovery and/or communications operations for normal priority UEs and for high priority UEs. At block 920, the serving cell 910 may send the ACB parameter to the UE 905 in a SIB2 message, for example.

At block 925, the UE 905 may process the message and identify the availability of a resource for D2D proximity service communications. As one example, the serving cell 910 may assign an ACB parameter for discovery and communication operations for high priority UEs to the UE 905. Accordingly, when barring is active for discovery operations for normal priority UEs (but not for high priority UEs), the UE 905 may identify that a resource is available. At block 930, the UE 905 may determine an establishment cause for requesting the identified available resource. The establishment cause may correspond to the assigned ACB parameter, e.g., an establishment cause requesting a resource discovery operations for high priority UEs. At block 935, the UE 905 sends an RRC connection request message to the serving cell 910. The RRC connection request message includes the establishment cause and informs the serving cell 910 that the UE 905 is requesting a resource available under current barring conditions. Accordingly, the serving cell 910 may allocate the resource to the UE 905 for D2D proximity service communications.

Figure 10:
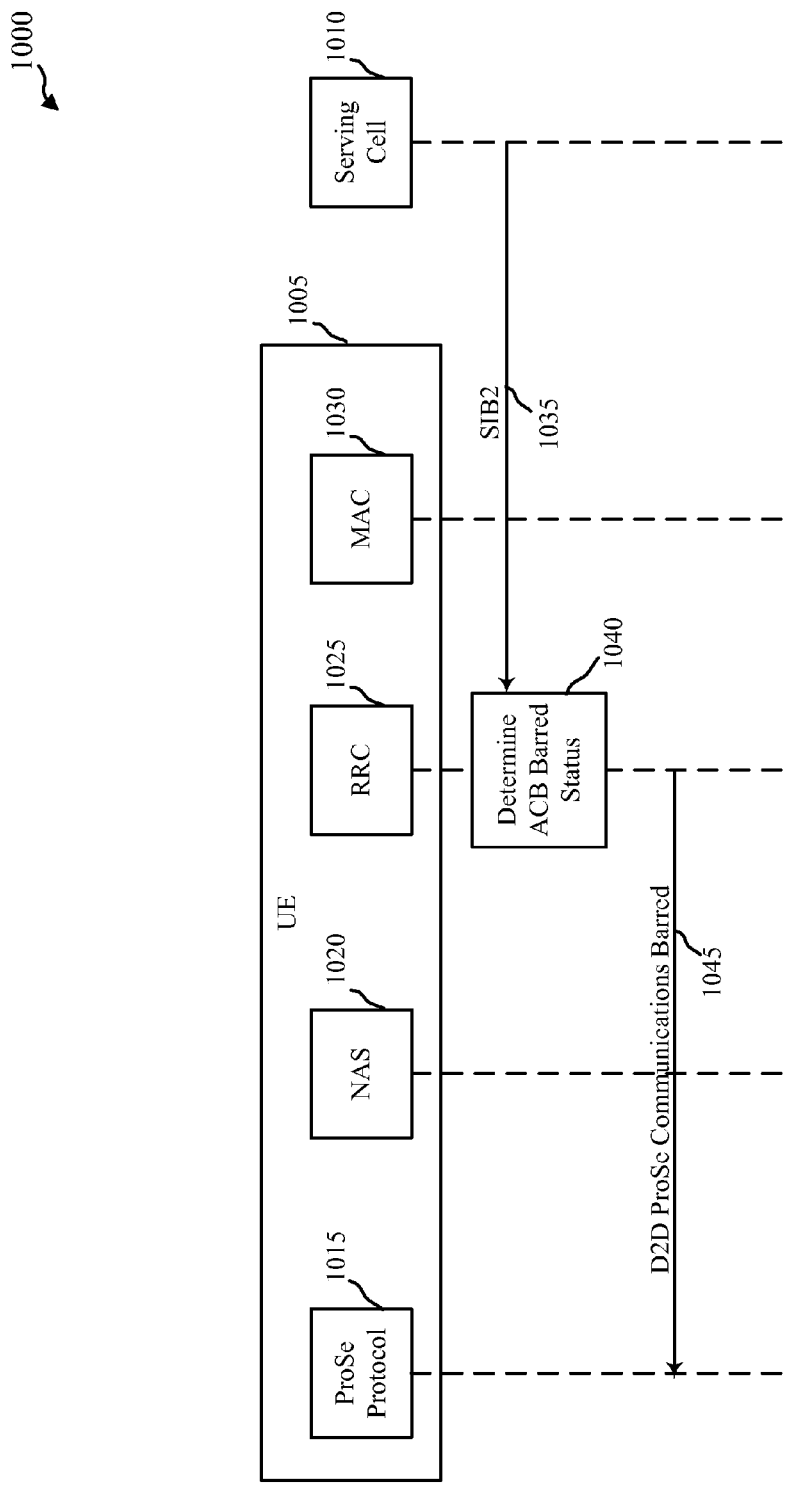
FIG. 10 shows a swim diagram illustrating aspects of D2D proximity service communications, in accordance with various aspects of the present disclosure.

FIG. 10 is a swim diagram 1000 illustrating aspects of D2D proximity service communications, in accordance with various aspects of the present disclosure. The diagram 1000 may illustrate aspects of the system 100, 400 and/or 700 described with reference to FIG. 1, 4, or 7, respectively. The diagram 1000 includes a UE 1005 and a serving cell 1010. The UE 1005 may be an example of one or more of the UEs 115 and/or devices 115 described above with respect to FIGS. 1, 2, 3, and/or 4. The serving cell 1010 may be an example of one or more of the base stations 105 and/or apparatuses 105 described above with respect to FIGS. 1, 5, 6, and/or 7. In some examples, the serving cell 1010 may be a serving cell of the UE 1005. Generally, the diagram 1000 illustrates aspects of implementing access class barring operations for D2D proximity service communications with the various protocols of the UE 1005. In some examples, a system device, such as one of the UEs 115 and/or base stations 105 may execute one or more sets of codes to control the functional elements of the device to perform some or all of the functions described below.

The UE 1005 may include a proximity service protocol 1015, a non-access stratum (NAS) 1020, a radio resource control (RRC) 1025, and a media access control (MAC) 1030. Each of these components may represent one or more protocols, layers, and/or functions operating on the UE 1005. In some examples, the components may be implemented by a processor module (e.g., the processor module 405) of the UE 1005 executing codes or instructions to perform the functions described below.

At block 1035, the serving cell 1010 may send a SIB2 message to the UE 1005 (e.g., the RRC 1025) indicating that barring operations of the serving cell 1010 are active. Per the functions discussed above, the UE 1005 may have been assigned an ACB parameter that indicates its ability to access resources when barring operations are active, dependent on its assigned ACB parameter and the barring condition. The SIB2 message may, as shown in FIG. 10, indicate that the UE 1005 is barred from accessing resources. Accordingly, at block 1040 the RRC 1025 may process the SIB2 message and determine that the UE 1005 is barred from accessing one or more resources. At block 1045, the RRC 1025 may send a signal to the proximity service protocol 1015 including information indicating that certain resources are barred for D2D proximity service communications, per the barred condition. As a result, the RRC 1025 may inform the proximity service protocol 1015 directly of the barred indication. In some examples where the UE 1005 is in an RRC connected mode, the RRC 1025 may send the service request reject message directly to the proximity service 1015 for type 2 direct discovery resources.

In some examples, the functions of the UE 1005 shown in FIG. 10 may be performed while the UE 1005 is in an RRC connected mode or RRC idle mode and the implicated resources may be for type 1 direct discovery resources. In some examples, the functions of the UE 1005 shown in FIG. 10 may be performed while the UE 1005 is in an RRC connected mode and the implicated resources may be for type 2 direct discovery resources. In some examples, the functions of the UE 1005 shown in FIG. 10 may be performed while the UE 1005 is in an RRC connected mode or an RRC idle mode and the implicated resources may be for mode 2 direct communication resources.

Figure 11:
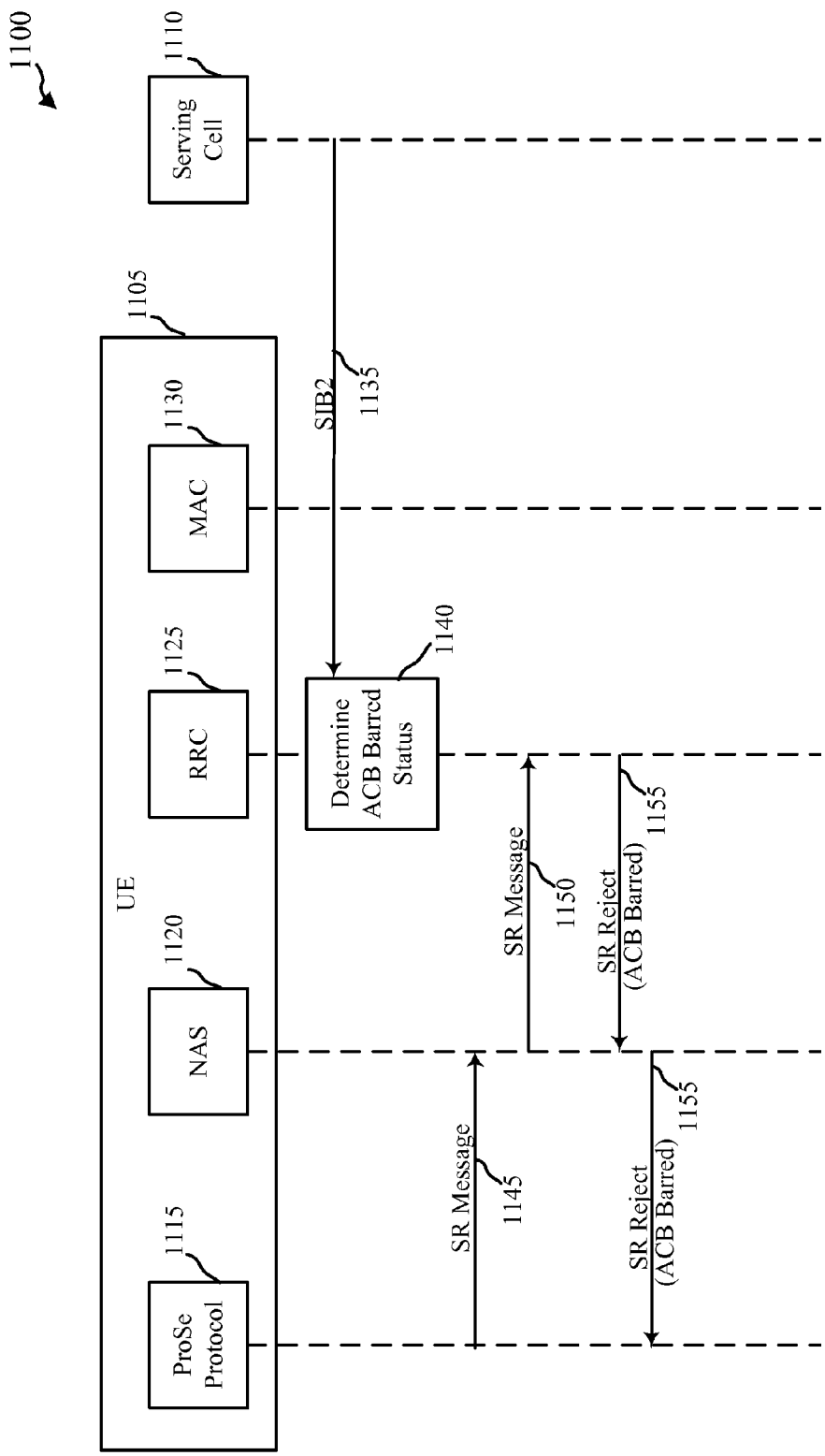
FIG. 11 shows a swim diagram illustrating aspects of D2D proximity service communications, in accordance with various aspects of the present disclosure.

FIG. 11 is a swim diagram 1100 illustrating aspects of D2D proximity service communications, in accordance with various aspects of the present disclosure. The diagram 1100 may illustrate aspects of the system 100, 400 and/or 700 described with reference to FIG. 1, 4, or 7, respectively. The diagram 1100 includes a UE 1105 and a serving cell 1110. The UE 1105 may be an example of one or more of the UEs 115 and/or devices 115 described above with respect to FIGS. 1, 2, 3, and/or 4. The serving cell 1110 may be an example of one or more of the base stations 105 and/or apparatuses 105 described above with respect to FIGS. 1, 5, 6, and/or 7. In some examples, the serving cell 1110 may be a serving cell of the UE 1105. Generally, the diagram 1100 illustrates aspects of implementing access class barring operations for D2D proximity service communications with the various protocols of the UE 1105. In some examples, a system device, such as one of the UEs 115 and/or base stations 105 may execute one or more sets of codes to control the functional elements of the device to perform some or all of the functions described below.

The UE 1105 may include a proximity service protocol 1115, a non-access stratum (NAS) 1120, a radio resource control (RRC) 1125, and a media access control (MAC) 1130. Each of these components may represent one or more protocols, layers, and/or functions operating on the UE 1105. In some examples, the components may be implemented by a processor module (e.g., the processor module 405) of the UE 1105 executing codes or instructions to perform the functions described below.

At block 1135, the serving cell 1110 may send a SIB2 message to the UE 1105 (e.g., the RRC 1125) indicating that barring operations of the serving cell 1110 are active. Per the functions discussed above, the UE 1105 may have been assigned an ACB parameter that indicates its ability to access resources when barring operations are active, dependent on its assigned ACB parameter and the barring condition. The SIB2 message may, as shown in FIG. 11, indicate that the UE 1105 is barred from accessing resources. Accordingly, at block 1140 the RRC 1125 may process the SIB2 message and determine that the UE 1105 is barred from accessing one or more resources.

At block 1145, the proximity service protocol 1115 may determine that a proximity service communication may be needed and send a service request message to the NAS 1120 to be forwarded to the RRC 1125. The service request may include an application code for the proximity service and may be used to request the RRC 1125 to establish a connection using the appropriate resource. At block 1155, the RRC may send a service request reject message to the NAS 1120 to be forwarded to the proximity service protocol 1115. The service request reject message may implement the barring operation with the UE 1105 and prevent the proximity service protocol 1115 from requesting or accessing barred resources. The service request reject message may include information indicating that certain resources are barred for D2D proximity service communications, per the barred condition. Accordingly, the RRC 1125 may inform the proximity service protocol 1115 of the barred indication via the service request rejection message via the NAS 1120.

In some examples, the functions of the UE 1105 shown in FIG. 11 may be performed while the UE 1105 is in an RRC idle mode and the implicated resources may be for type 2 direct discovery resources. In some examples, the functions of the UE 1105 shown in FIG. 11 may be performed while the UE 1105 is in an RRC connected mode or an RRC idle mode and the implicated resources may be for mode 1 direct communication resources.

Figure 12:
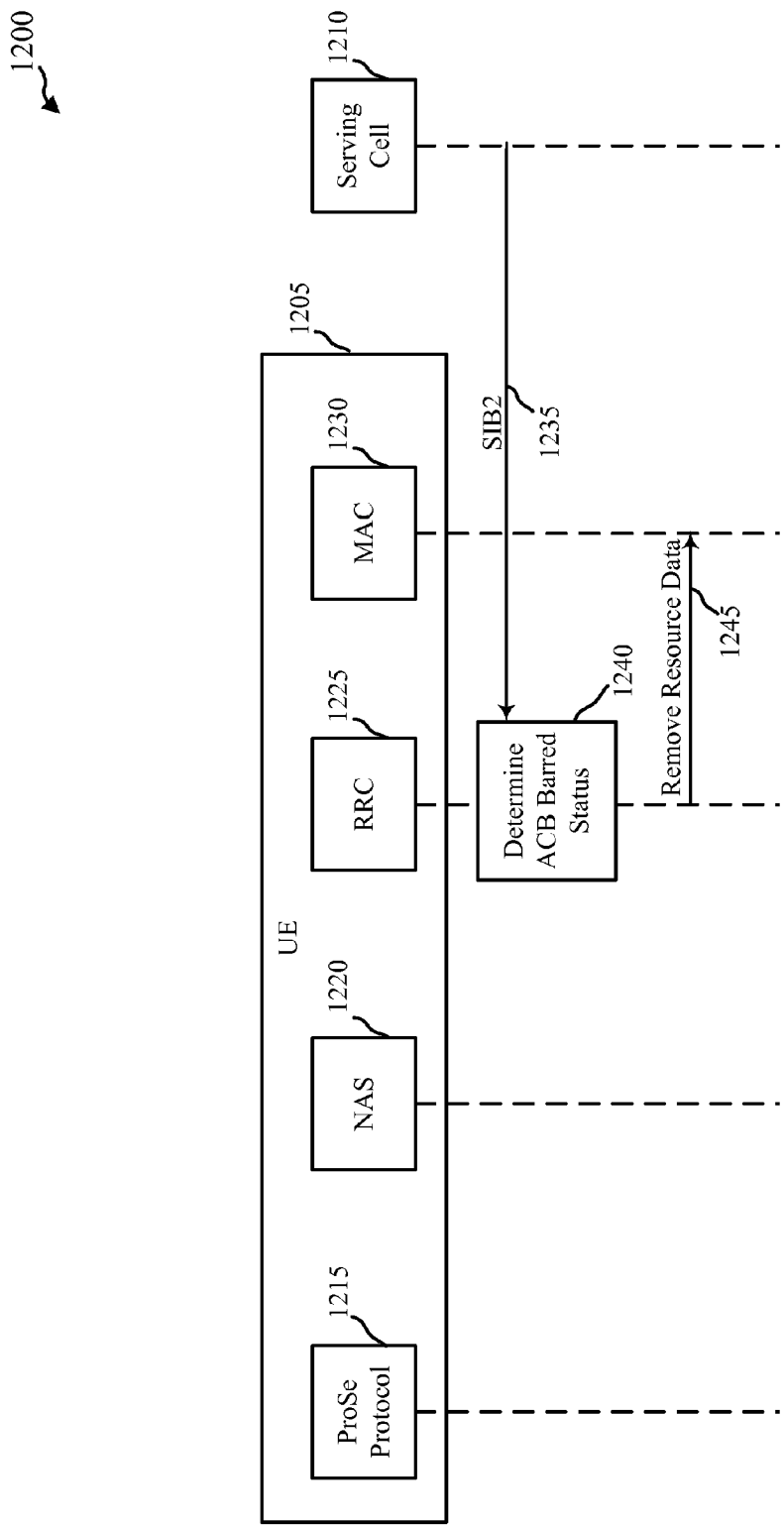
FIG. 12 shows a swim diagram illustrating aspects of D2D proximity service communications, in accordance with various aspects of the present disclosure.

FIG. 12 is a swim diagram 1200 illustrating aspects of D2D proximity service communications, in accordance with various aspects of the present disclosure. The diagram 1200 may illustrate aspects of the system 100, 400 and/or 700 described with reference to FIG. 1, 4, or 7, respectively. The diagram 1200 includes a UE 1205 and a serving cell 1210. The UE 1205 may be an example of one or more of the UEs 115 and/or devices 115 described above with respect to FIGS. 1, 2, 3, and/or 4. The serving cell 1210 may be an example of one or more of the base stations 105 and/or apparatuses 105 described above with respect to FIGS. 1, 5, 6, and/or 7. In some examples, the serving cell 1210 may be a serving cell of the UE 1205. Generally, the diagram 1200 illustrates aspects of implementing access class barring operations for D2D proximity service communications with the various protocols of the UE 1205. In some examples, a system device, such as one of the UEs 115 and/or base stations 105 may execute one or more sets of codes to control the functional elements of the device to perform some or all of the functions described below.

The UE 1205 may include a proximity service protocol 1215, a non-access stratum (NAS) 1220, a radio resource control (RRC) 1225, and a media access control (MAC) 1230. Each of these components may represent one or more protocols, layers, and/or functions operating on the UE 1205. In some examples, the components may be implemented by a processor module (e.g., the processor module 405) of the UE 1205 executing codes or instructions to perform the functions described below.

At block 1235, the serving cell 1210 may send a SIB2 message to the UE 1205 (e.g., the RRC 1225) indicating that barring operations of the serving cell 1210 are active. Per the functions discussed above, the UE 1205 may have been assigned an ACB parameter that indicates its ability to access resources when barring operations are active, dependent on its assigned ACB parameter and the barring condition. The SIB2 message may, as shown in FIG. 12, indicate that the UE 1205 is barred from accessing resources. Accordingly, at block 1240 the RRC 1225 may process the SIB2 message and determine that the UE 1205 is barred from accessing one or more resources. At block 1245, the RRC 1225 may send a signal to the MAC 1230 that removes information associated with radio resources for the resources for D2D proximity service communications, per the barred condition. For example, the serving cell 1210 may provide information associated with radio resources for a pool of resources in a SIB17 message. The RRC 1225 may process the SIB17 message and remove the information associated with the radio resources to implement the barred status for the UE 1205. Accordingly, the UE 1205 may effectively refrain from processing the SIB17 message if barring operations are active and the UE 1205 is barred. In some examples, the functions of the UE 1205 shown in FIG. 12 may be performed while the UE 1005 is in an RRC connected mode or RRC idle mode and the implicated resources may be for type 1 direct discovery resources and for mode 2 communication resources.

Figure 13:
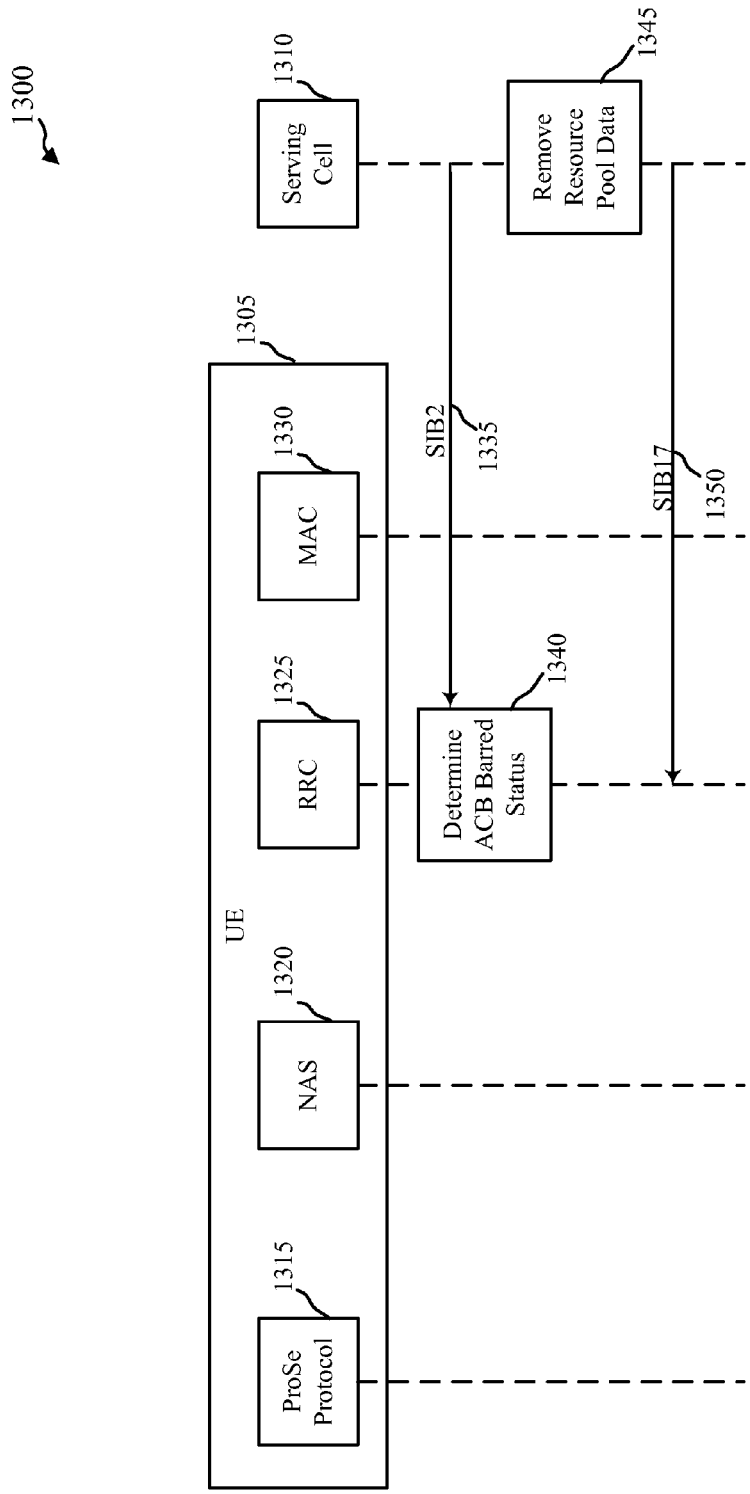
FIG. 13 shows a swim diagram illustrating aspects of D2D proximity service communications, in accordance with various aspects of the present disclosure.

FIG. 13 is a swim diagram 1300 illustrating aspects of D2D proximity service communications, in accordance with various aspects of the present disclosure. The diagram 1300 may illustrate aspects of the system 100, 400 and/or 700 described with reference to FIG. 1, 4, or 7, respectively. The diagram 1300 includes a UE 1305 and a serving cell 1310. The UE 1305 may be an example of one or more of the UEs 115 and/or devices 115 described above with respect to FIGS. 1, 2, 3, and/or 4. The serving cell 1310 may be an example of one or more of the base stations 105 and/or apparatuses 105 described above with respect to FIGS. 1, 5, 6, and/or 7. In some examples, the serving cell 1310 may be a serving cell of the UE 1205. Generally, the diagram 1300 illustrates aspects of implementing access class barring operations for D2D proximity service communications by the serving cell 1310. In some examples, a system device, such as one of the UEs 115 and/or base stations 105 may execute one or more sets of codes to control the functional elements of the device to perform some or all of the functions described below.

The UE 1305 may include a proximity service protocol 1315, a non-access stratum (NAS) 1320, a radio resource control (RRC) 1325, and a media access control (MAC) 1330. Each of these components may represent one or more protocols, layers, and/or functions operating on the UE 1305. In some examples, the components may be implemented by a processor module (e.g., the processor module 405) of the UE 1305 executing codes or instructions to perform the functions described below.

At block 1335, the serving cell 1310 may send a SIB2 message to the UE 1305 (e.g., the RRC 1325) indicating that barring operations of the serving cell 1310 are active. Per the functions discussed above, the UE 1305 may have been assigned an ACB parameter that indicates its ability to access resources when barring operations are active, dependent on its assigned ACB parameter and the barring condition. The SIB2 message may, as shown in FIG. 13, indicate that the UE 1305 is barred from accessing resources. Accordingly, at block 1340 the RRC 1325 may process the SIB2 message and determine that the UE 1305 is barred from accessing one or more resources. The serving cell 1310 may, based on the SIB2 message, know that the UE 1305 is barred from accessing resources for D2D proximity service communications. Accordingly, at block 1345, the serving cell 1310 may remove information associated with radio resources for a pool of resources from a SIB17 message and send the SIB17 message to the UE 1305 at block 1350. Accordingly, the UE 1305 may not access resources from the pool of resources.

Figure 14:
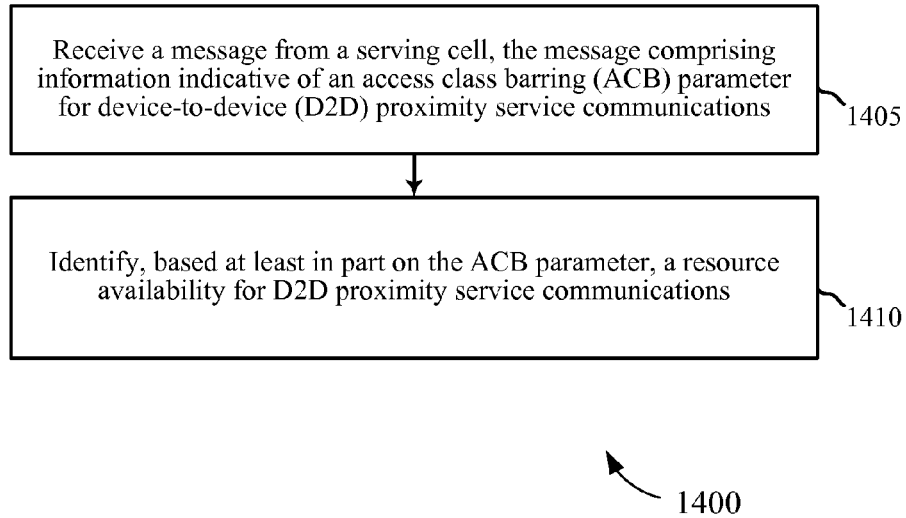
FIG. 14 is a flow chart illustrating an example of a method for wireless communication, in accordance with various aspects of the present disclosure.

FIG. 14 is a flow chart illustrating an example of a method 1400 for wireless communication, in accordance with various aspects of the present disclosure. For clarity, the method 1400 is described below with reference to aspects of one or more of the UEs described with reference to FIG. 1, 8, 9, 10, 11, 12, or 13, and/or aspects of one or more of the devices described with reference to FIG. 2, 3, or 4. In some examples, a UE may execute one or more sets of codes to control the functional elements of the UE to perform the functions described below. Additionally or alternatively, the UE may perform one or more of the functions described below using special-purpose hardware.

At block 1405, the method 1400 may include the UE receiving a message from a serving cell. The message may include information indicative of an ACB parameter for D2D proximity service communications. The ACB parameter may be associated with discovery or communication operations for normal priority UEs and for high priority UEs. At block 1410, the UE may identify, based at least in part on the ACB parameter, a resource availability for D2D proximity service communications. For example, the UE may identify the resource availability based on the based on the assigned ACB parameter, that barring operations are active, the type of resource needed for D2D proximity service communications, and the barring conditions that warranted the barring operation.

The operation(s) at blocks 1405 and 1410 may be performed using the ACB module 205/410 described with reference to FIG. 2, 3, or 4.

Thus, the method 1400 may provide for wireless communication. It should be noted that the method 1400 is just one implementation and that the operations of the method 1400 may be rearranged or otherwise modified such that other implementations are possible.

Figure 15:
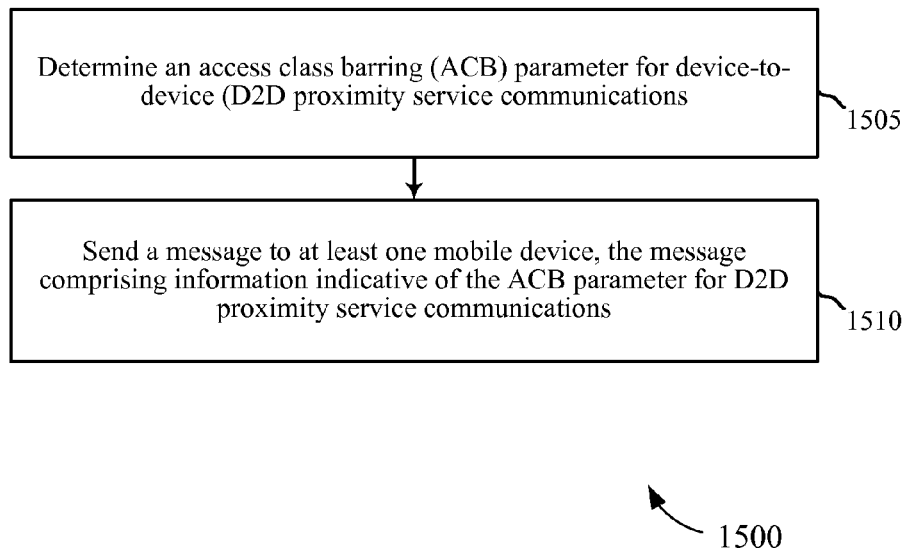
FIG. 15 is a flow chart illustrating an example of a method for wireless communication, in accordance with various aspects of the present disclosure.

FIG. 15 is a flow chart illustrating an example of a method 1500 for wireless communication, in accordance with various aspects of the present disclosure. For clarity, the method 1500 is described below with reference to aspects of one or more of the base stations, apparatuses, and/or serving cells described with reference to FIG. 1, 6, 7, 8, 9, 10, 11, 12, or 13. In some examples, a base station may execute one or more sets of codes to control the functional elements of the base station to perform the functions described below.

Additionally or alternatively, the base station may perform one or more of the functions described below using special-purpose hardware.

At block 1505, the method 1500 may include the base station determining an ACB parameter for D2D proximity service communications. The ACB parameter may be associated with discovery or communication operations for normal priority UEs and for high priority UEs. At block 1510, the base station may send a message to at least one mobile device (UE). The message may include information indicative of the ACB parameter for D2D proximity service communications. The message may be sent in a SIB2 message.

The operation(s) at blocks 1505 and 1510 may be performed using the barring management module 510/710 described with reference to FIG. 5, 6, or 7.

Thus, the method 1500 may provide for wireless communication. It should be noted that the method 1500 is just one implementation and that the operations of the method 1500 may be rearranged or otherwise modified such that other implementations are possible.

Figure 16:
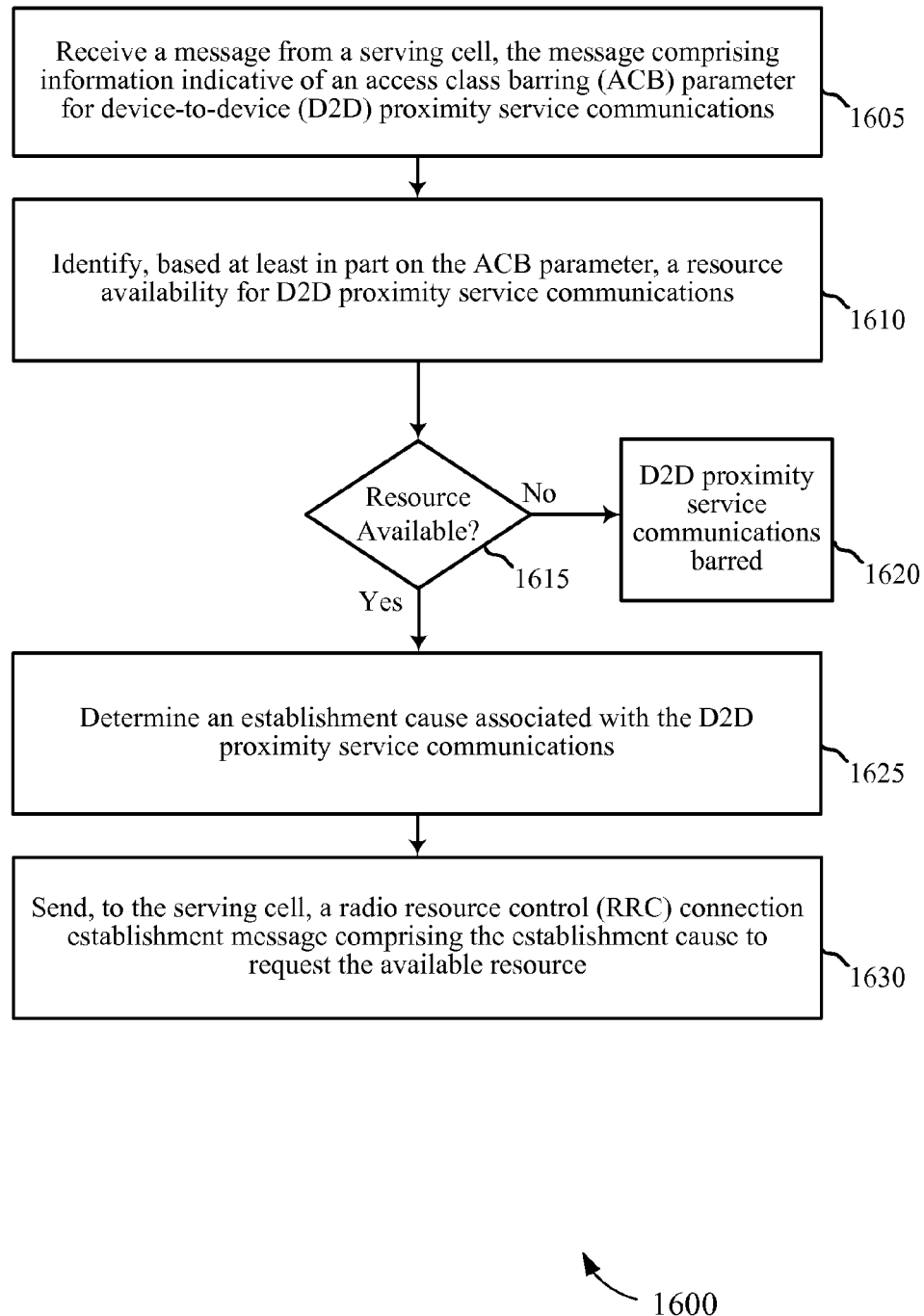
FIG. 16 is a flow chart illustrating an example of a method for wireless communication, in accordance with various aspects of the present disclosure.

FIG. 16 is a flow chart illustrating an example of a method 1600 for wireless communication, in accordance with various aspects of the present disclosure. For clarity, the method 1600 is described below with reference to aspects of one or more of the UEs described with reference to FIG. 1, 8, 9, 10, 11, 12, or 13, and/or aspects of one or more of the devices described with reference to FIG. 2, 3, or 4. In some examples, a UE may execute one or more sets of codes to control the functional elements of the UE to perform the functions described below. Additionally or alternatively, the UE may perform one or more of the functions described below using special-purpose hardware.

At block 1605, the method 1600 may include the UE receiving a message from a serving cell. The message may include information indicative of an ACB parameter for D2D proximity service communications. The ACB parameter may be associated with discovery or communication operations for normal priority UEs and for high priority UEs. At block 1610, the UE may identify, based at least in part on the ACB parameter, a resource availability for D2D proximity service communications. For example, the UE may identify the resource availability based on the based on the assigned ACB parameter, that barring operations are active, the type of resource needed for D2D proximity service communications, and the barring conditions that warranted the barring operation. At block 1615, the UE may determine if a resource is available based on the identified resource. For example, if barring is active and the assigned ACB parameter does not permit the UE to access the relevant resource, the UE may determine that no resource is available and, accordingly, at block 1620 the UE may determine that D2D proximity service communications are prohibited or otherwise barred.

If, however, the UE determines that a resource is available, at block 1625 the UE may determine an establishment cause associated with the D2D proximity service communications. For example, the establishment cause may correspond to the assigned ACB parameter and be associated with discovery and/or communication resources for normal and high priority UEs. At block 1630, the UE may send an RRC connection request or establishment message to the serving cell. The RRC connection request message may include the establishment cause to request the available resource.

The operation(s) at blocks 1605, 1610, 1615, 1620, 1625 and 1630 may be performed using the ACB module 205/410 described with reference to FIG. 2, 3, or 4.

Thus, the method 1600 may provide for wireless communication. It should be noted that the method 1600 is just one implementation and that the operations of the method 1600 may be rearranged or otherwise modified such that other implementations are possible.

In some examples, aspects from two or more of the methods 1400, 1500, and/or 1600 may be combined. It should be noted that the methods 1400, 1500, and 1600 are just example implementations, and that the operations of the methods 1400-1600 may be rearranged or otherwise modified such that other implementations are possible.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (WiFi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed and/or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for wireless communications, comprising:
   receiving a message from a serving cell, the message comprising information indicative of an access class barring (ACB) parameter for device-to-device (D2D) proximity service communications;
   identifying, based at least in part on the ACB parameter, a resource availability for D2D proximity service communications;
   determining that ACB is active for D2D proximity service communications; and
   refraining from processing a subsequent message from the serving cell based at least in part on the determining, the subsequent message comprising information associated with a pool of resources for D2D proximity service communications.

2. The method of claim 1, wherein the ACB parameter is associated with non-high priority mobile devices or high priority mobile devices and the resource is associated with discovery operations or communication operations for D2D proximity service communications.

3. The method of claim 1, further comprising:
   processing the message received from the serving cell while in a radio resource control (RRC) idle mode or an RRC connected mode.

4. The method of claim 1, wherein the message comprises a system information block (SIB) conveying the ACB parameter.

5. The method of claim 4, wherein the SIB is a type 2 SIB.

6. The method of claim 1, further comprising:
   determining an establishment cause associated with the D2D proximity service communications; and
   sending, to the serving cell, a radio resource control (RRC) connection establishment message comprising the establishment cause to request the available resource.

7. The method of claim 6, wherein the establishment cause is associated with a non-high priority mobile device or a high priority device and the requested resource is associated with discovery operations or communication operations for D2D proximity service communications.

8. The method of claim 1, wherein the pool of resources are associated with discovery operations for D2D proximity service communications.

9. The method of claim 1, further comprising:
   processing the message received from the serving cell while in a radio resource control (RRC) idle mode or an RRC connected mode.

10. The method of claim 1, wherein the subsequent message comprises a type 17 system information block (SIB).

11. The method of claim 1, further comprising:
determining, by a radio resource control (RRC) protocol on a mobile device, that ACB is active for D2D proximity service communications; and
communicating, to a protocol on the mobile device, an indication that D2D proximity service communications are barred.

12. The method of claim 11, wherein the message comprises a system information block (SIB) comprising information indicating that ACB is active.

13. The method of claim 12, wherein the SIB is a type 2 SIB.

14. The method of claim 11, wherein the protocol is a proximity service protocol and communicating the indication that D2D proximity service communications are barred comprises:
receiving a service request message from the proximity service protocol; and
communicating an indication to the proximity service protocol that discovery operations for D2D proximity service communications are barred.

15. The method of claim 14, wherein the mobile device is in an RRC idle mode or an RRC connected mode.

16. The method of claim 11, wherein the protocol is a non-access stratum (NAS) protocol and communicating the indication that D2D proximity service communication are barred comprises:
receiving a service request message from the NAS protocol on the mobile device; and
communicating a service request reject message to the NAS protocol indicating that communication operations for D2D proximity service communications are barred.

17. The method of claim 16, wherein the mobile device is in an RRC idle mode.

18. The method of claim 1, further comprising:
determining, by a radio resource control (RRC) protocol on a mobile device, that ACB is active for D2D proximity service communications.

19. The method of claim 18, wherein the resource is a discovery operation resource for D2D proximity service communications, further comprising:
removing information associated with radio resources for the discovery operation; and
wherein the mobile device is in an RRC idle mode or an RRC connected mode.

20. The method of claim 18, wherein the resource is a communication operation resource for D2D proximity service communications, further comprising:
refraining from sending a buffer status report for D2D proximity service communications; and
wherein the mobile device is in an RRC connected mode.

21. The method of claim 18, wherein the resource is a communication operation resource for D2D proximity service communications, further comprising:
removing information associated with radio channel parameters for the communication operation resource; and
wherein the mobile device is in an RRC idle mode or an RRC connected mode.

22. An apparatus for wireless communications, comprising:
a processor;
memory in electronic communication with the processor; and
instructions being stored in the memory, the instructions being executable by the processor to:
receive a message from a serving cell, the message comprising information indicative of an access class barring (ACB) parameter for device-to-device (D2D) proximity service communications;
identify, based at least in part on the ACB parameter, a resource availability for D2D proximity service communications;
determine that ACB is active for D2D proximity service communications; and
refrain from processing a subsequent message from the serving cell based at least in part on the determining, the subsequent message comprising information associated with a pool of resources for D2D proximity service communications.

23. An apparatus for wireless communications, comprising:
means for receiving a message from a serving cell, the message comprising information indicative of an access class barring (ACB) parameter for device-to-device (D2D) proximity service communications;
means for identifying, based at least in part on the ACB parameter, a resource availability for D2D proximity service communications;
means for determining that ACB is active for D2D proximity service communications; and
means for refraining from processing a subsequent message from the serving cell based at least in part on the determining, the subsequent message comprising information associated with a pool of resources for D2D proximity service communications.

24. A method of wireless communications, comprising:
determining an access class barring (ACB) parameter for device-to-device (D2D) proximity service communications;
sending a message to at least one mobile device, the message comprising information indicative of the ACB parameter for D2D proximity service communications;
determining that ACB is active; and
removing a resource associated with D2D proximity service communications based at least in part on determining that ACB is active, wherein removing the resource comprises refraining from sending an indication of the resource in a subsequent message to one or more mobile devices, and wherein the subsequent message comprises a type 17 system information block (SIB).

25. The method of claim 24, wherein the ACB parameter comprises an ACB parameter for one or more of a discovery operation for non-high priority mobile devices, a communication operation for non-high priority mobile devices, a discovery operation for high priority mobile devices, and a communication operation for high priority mobile devices.

26. The method of claim 24, further comprising:
receiving a message from at least one mobile device requesting an available resource for D2D proximity service communications, wherein the message comprises a radio resource control (RRC) connection request message.

27. The method of claim 26, wherein the RRC connection request message comprises a connection establishment clause based on one or more of a discovery operation for non-high priority mobile devices, a communication operation for non-high priority mobile devices, a discovery operation for high priority mobile devices, and a communication operation for high priority mobile devices.

28. The method of claim 24, wherein the message comprises a SIB conveying the ACB parameter, and wherein the SIB is a type 2 SIB.

* * * * *